(12) United States Patent
Watanabe

(10) Patent No.: US 6,956,934 B2
(45) Date of Patent: Oct. 18, 2005

(54) MANAGEMENT SYSTEM AND METHOD, AND DATA PROCESSING APPARATUS

(75) Inventor: Hidehiko Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 94 days.

(21) Appl. No.: 10/270,008

(22) Filed: Oct. 15, 2002

(65) Prior Publication Data

US 2003/0088555 A1 May 8, 2003

(30) Foreign Application Priority Data

Oct. 16, 2001 (JP) .................................. 2001-317644

(51) Int. Cl.[7] ........................................... H04M 11/00
(52) U.S. Cl. ..................... 379/100.03; 379/102.02; 379/93.01; 379/106.01; 358/468
(58) Field of Search ............... 379/100.01–106.17, 379/93.01, 201.05; 358/440–446, 468; 340/825.22

(56) References Cited

U.S. PATENT DOCUMENTS

| | | | | |
|---|---|---|---|---|
| 4,972,183 A | * | 11/1990 | Kuhlmann et al. .... | 340/825.22 |
| 5,151,932 A | * | 9/1992 | Arizumi et al. ........ | 379/106.06 |
| 5,235,634 A | * | 8/1993 | Oliver ................... | 379/106.06 |
| 5,355,404 A | * | 10/1994 | LeDuc et al. .......... | 379/201.05 |
| 5,406,269 A | * | 4/1995 | Baran .................... | 379/106.01 |
| 5,434,650 A | | 7/1995 | Nakahara et al. | |
| 5,512,979 A | | 4/1996 | Ogura | |
| 5,677,947 A | * | 10/1997 | Oliver ................... | 379/106.03 |
| 5,727,248 A | * | 3/1998 | Ogura ........................... | 399/8 |
| 5,905,779 A | * | 5/1999 | Steinmetz ................ | 379/93.01 |
| 5,936,746 A | * | 8/1999 | Hirokawa ................... | 358/468 |
| 2002/0010854 A1 | | 1/2002 | Ogura et al. | |
| 2002/0191215 A1 | | 12/2002 | Watanabe | |

FOREIGN PATENT DOCUMENTS

| | | |
|---|---|---|
| EP | 0 509 528 A2 | 4/1992 |
| JP | 07-058875 | 3/1995 |

* cited by examiner

*Primary Examiner*—Wing F. Chan
(74) *Attorney, Agent, or Firm*—Dickstein Shapiro Morin & Oshinsky LLP

(57) ABSTRACT

A center apparatus manages a to-be-managed apparatus, wherein: the center apparatus performs a management operation on the to-be-managed apparatus by making a call to the to-be-managed apparatus so as to establish a communications circuit therewith according to predetermined parameters; and the to-be-managed apparatus makes a parameter change occurrence inquiry to the center apparatus at predetermined intervals for inquiring the center apparatus whether or not a parameter change occurs.

21 Claims, 18 Drawing Sheets

FIG.5

| No. | PARAMETER NAME |
|---|---|
| 1 | SC/MC TEL NO. |
| 2 | RE-DIAL WAITING TIME THEREFOR |
| 3 | NUMBER OF TIMES OF RE-DIALING THEREFOR |
| 4 | ALARM CALL TEL NO. |
| 5 | RE-DIAL WAITING TIME THEREFOR |
| 6 | NUMBER OF TIMES OF RE-DIALING THEREFOR |
| 7 | BLOCK BILLING TEL NO. |
| 8 | RE-DIAL WAITING TIME THEREFOR |
| 9 | NUMBER OF TIMES OF RE-DIALING THEREFOR |
| 10 | PPC TYPE/MANUFACTURE NO. OF DEVICE ADDRESS 0 |
| 11 | PPC TYPE/MANUFACTURE NO. OF DEVICE ADDRESS 1 |
| 12 | PPC TYPE/MANUFACTURE NO. OF DEVICE ADDRESS 2 |
| 13 | PPC TYPE/MANUFACTURE NO. OF DEVICE ADDRESS 3 |
| 14 | PPC TYPE/MANUFACTURE NO. OF DEVICE ADDRESS 4 |
| 15 | COUNTER REPORTING DATE OF DEVICE ADDRESS 0 |
| 16 | COUNTER REPORTING DATE OF DEVICE ADDRESS 1 |
| 17 | COUNTER REPORTING DATE OF DEVICE ADDRESS 2 |
| 18 | COUNTER REPORTING DATE OF DEVICE ADDRESS 3 |
| 19 | COUNTER REPORTING DATE OF DEVICE ADDRESS 4 |
| 20 | ALARM CALL REPORTING TIME |
| 21 | BLOCK BILLING CALL REPORTING TIME |
| 22 | COUNTER CALL REPORTING TIME |

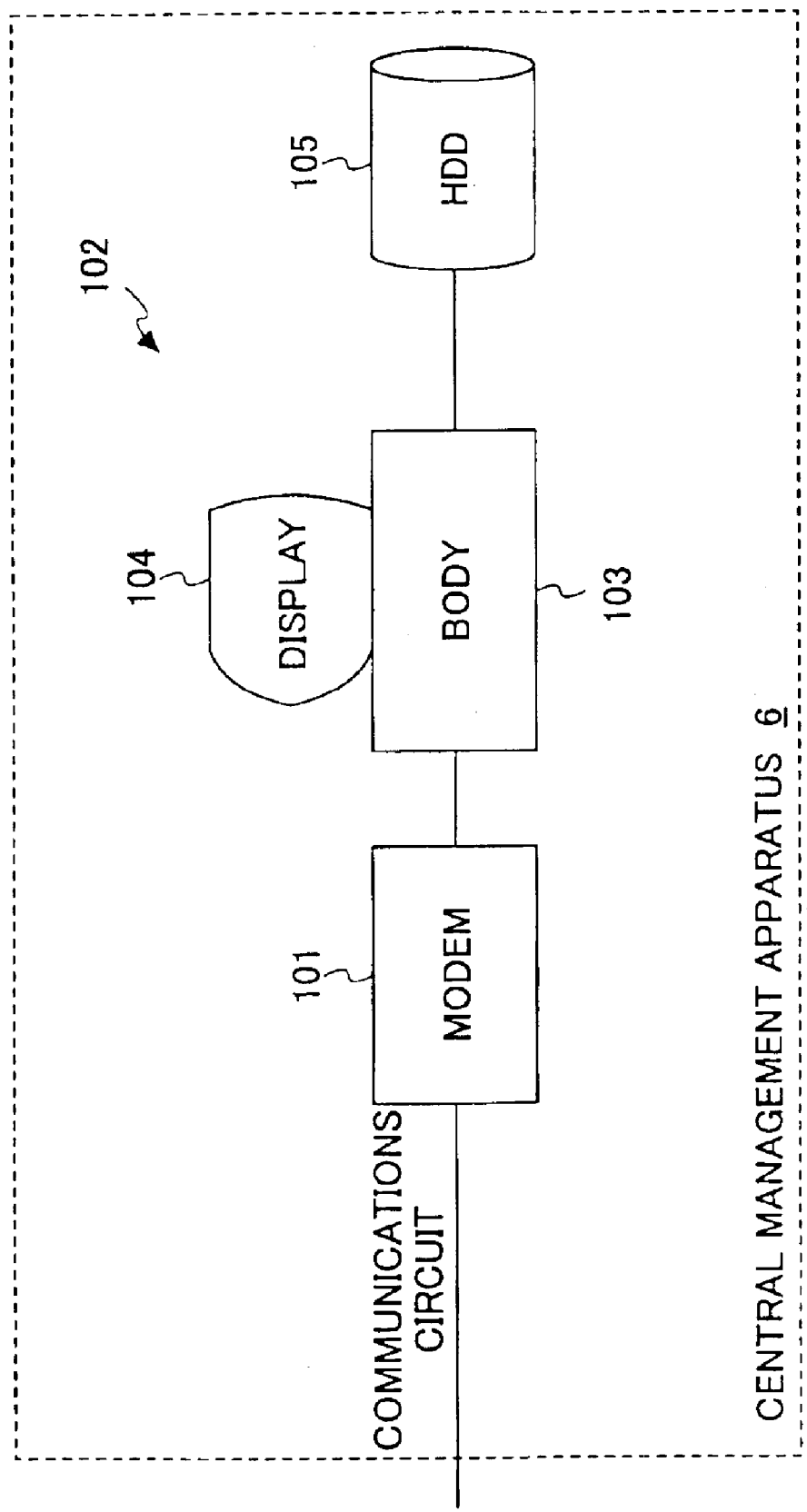

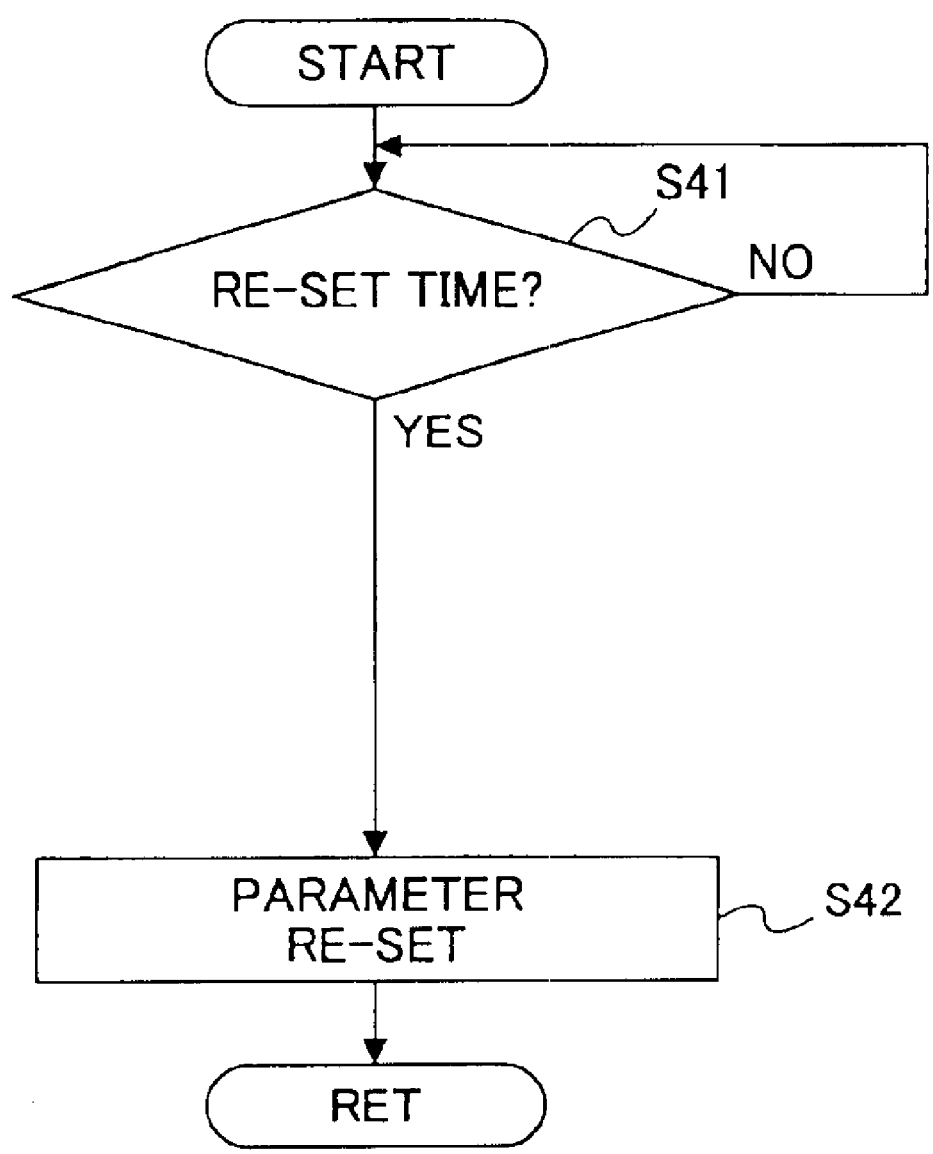

MANAGEMENT SYSTEM AND METHOD, AND DATA PROCESSING APPARATUS

BACKGROUND OF THE INVENTION

1. Field of the Invention

The present invention relates to a management system in which management is performed from a central unit to remote units.

2. Description of the Related Art

As a data-communications system, as disclosed in Japanese laid-open patent application No. 7-58875, image formation apparatuses such as copying machines installed at places of unspecified users (customers) operate on condition of receiving remote diagnosis from a central management apparatus installed at a service center (base of sales and service etc.), where they are connected by means of communications circuits such as a public network. Then, remote management of the image formation apparatuses by the central management apparatus is performed through the communications circuits.

In such an image formation apparatus management system, each image formation apparatus counts the number of sheets on image formation (summation) according to image formation operation, and each is equipped with a counter which stores the count value. A data-communications apparatus attached to each image formation apparatus periodically (for example, every day at a predetermined time) obtains the above-mentioned count value therefrom as status information. Then, the data-communications apparatus calls the central management apparatus periodically (for example, every month, at a predetermined date and time) via the communications circuit, and then, sends the status information obtained from the image formation apparatus.

In such a management system, in some case according to a user's condition, the central management apparatus may not call the data-communications apparatus, and may only receive call from the user. For example, at the user point, since a call received is not necessarily connected to an extension connected to the data-communications apparatus in a condition in which a pilot number system is applied by using a private branch exchange (henceforth "PBX"), access from the central management apparatus is not permitted. Moreover, since a telephone operator may not understand to which line a call coming from the central management apparatus should be connected in a condition where a telephone call from the outside line to an extension telephone set is made manually by the operator, access from the central management apparatus is not permitted either.

In such a case, in case the telephone number of the central management apparatus is changed, the predetermined date at which the status information is to be summarized for the management is changed, or the like, for example, such a notice cannot be sent to the data-communications apparatus positively from the central management apparatus. Therefore, in order to positively send such a notice, a service person should go to the place of the relevant user, and should manually change the relevant parameters on the data-communications apparatus for the purpose of update.

SUMMARY OF THE INVENTION

The present invention is made to solve such a problem, and an object of the present invention is to provide a data-communications system in which, even in a situation in which access from the central management apparatus is not permitted, a required change of a parameter arising at the central management apparatus can be easily and positively reflected on the data-communications apparatus at the end of a user.

According to the present invention, a center apparatus manages a to-be-managed apparatus (such as a data-communications apparatus and/or image formation apparatus), wherein the center apparatus performs a management operation on the to-be-managed apparatus by making a call to the to-be-managed apparatus so as to establish a communications circuit therewith according to predetermined parameters; and the to-be-managed apparatus makes a parameter change occurrence inquiry to the center apparatus for inquiring the center apparatus whether or not any parameter change occurs.

Thus, as the to-be-managed apparatus makes the parameter change occurrence inquiry to the center apparatus, the center apparatus can have an occasion at which it can make a contact with the to-be-managed apparatus, in response to the inquiry call, so as to send necessary information to the to-be-managed apparatus. Thus, the center apparatus can ensure that the latest parameter information be set in the to-be-managed apparatus positively.

Accordingly, it is possible to improve the operation efficiency in the management work, and achieve smooth operation of the management system.

BRIEF DESCRIPTION OF THE DRAWINGS

Other objects and further features of the present invention will become more apparent from the following detailed description when read in conjunction with the following accompanying drawings:

FIG. 5 shows an example of contents of various parameters used in management of each image formation apparatus according to the management system of the present invention stored in a non-volatile RAM shown in FIG. 4;

FIG. 11 illustrates a configuration in an example of the central management apparatus shown in FIG. 1;

FIGS. 12A and 12B illustrate an operation of a parameter re-setting processing performed by the data-communications apparatus according to the present invention;

DETAILED DESCRIPTION OF THE PREFERRED EMBODIMENTS

Figure 1:
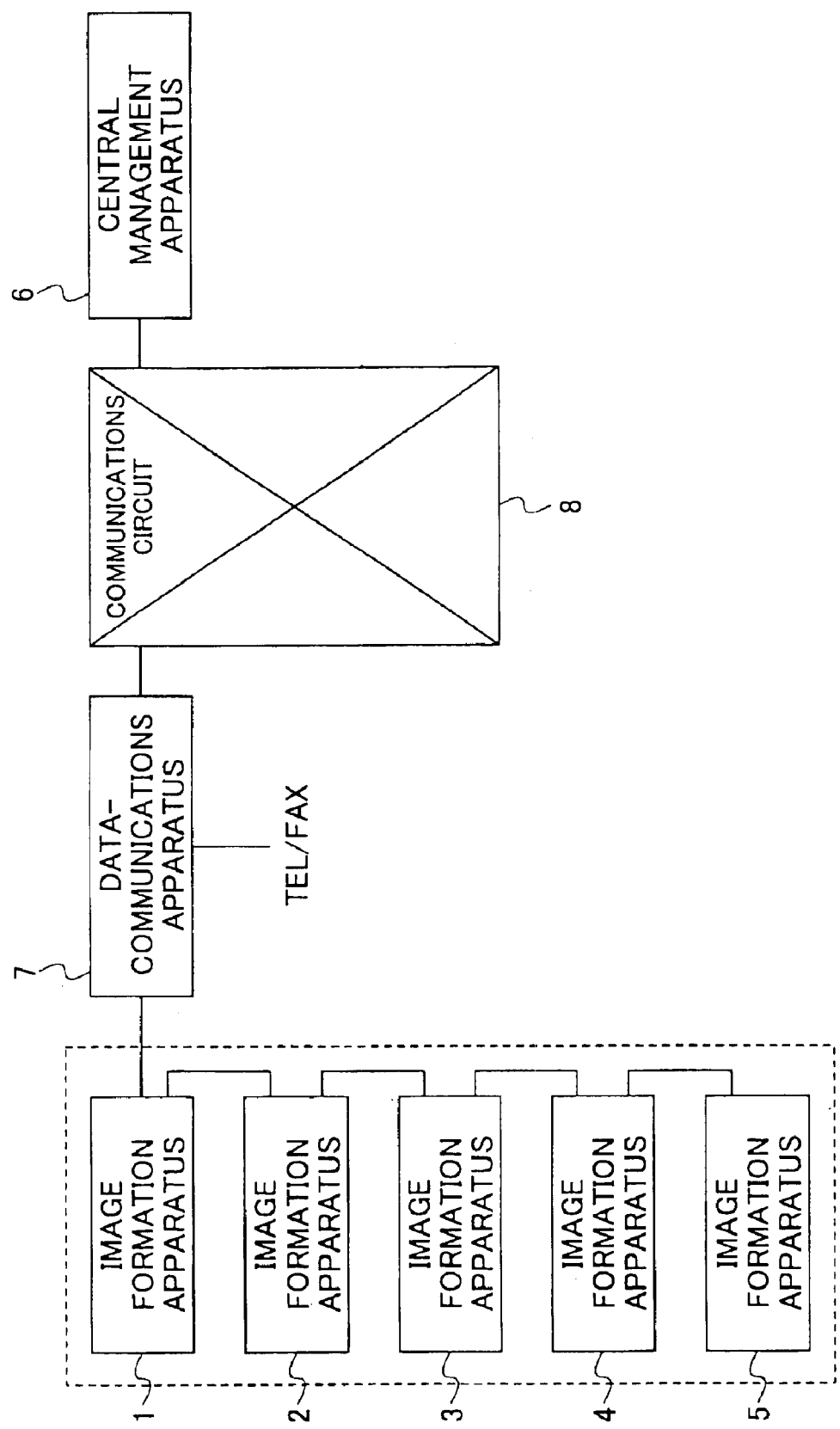
FIG. 1 illustrates an image formation apparatus management system according to the present invention.

FIG. 1 is a block diagram showing an example of configuration of an image formation apparatus management system including a data-communications apparatus and a central management apparatus according to the present invention. This image formation apparatus management system includes the plurality of sets of image formation apparatuses (copying machines etc.) 1–5 on condition of remote diagnosis; the data-communications apparatus 7, and the central management apparatus 6. The central management apparatus 6 carries out remote management/diagnosis of each image formation apparatus 1–5 intensively through a communications circuit 8, such as a public circuit or a leased line, via the data-communications apparatus 7.

The data-communications apparatus 7 has a connection device connect with each image formation apparatus 1–5, transmits alternatively an instruction signal sent via the communications circuit 8 from the central management apparatus 6 to the image formation apparatus 1–5, or transmits various report information (status information) reversely sent from the image formation apparatus 1–5 to the central management apparatus 6 by means of the communications circuit 8.

Usually, this data-communications apparatus 7 operates for whole day, and thus, can perform communications with the central management apparatus 6 at night while the power supply of the image formation apparatus 1–5 may be turned off. This data-communications apparatus 7 and each image formation apparatus 1–5 are connected in a multi-drop connection manner by means of a serial communication interface RS-485, and polling/selecting operations are made by the data-communications apparatus 7 onto each image formation apparatus 1–5.

Figure 2:
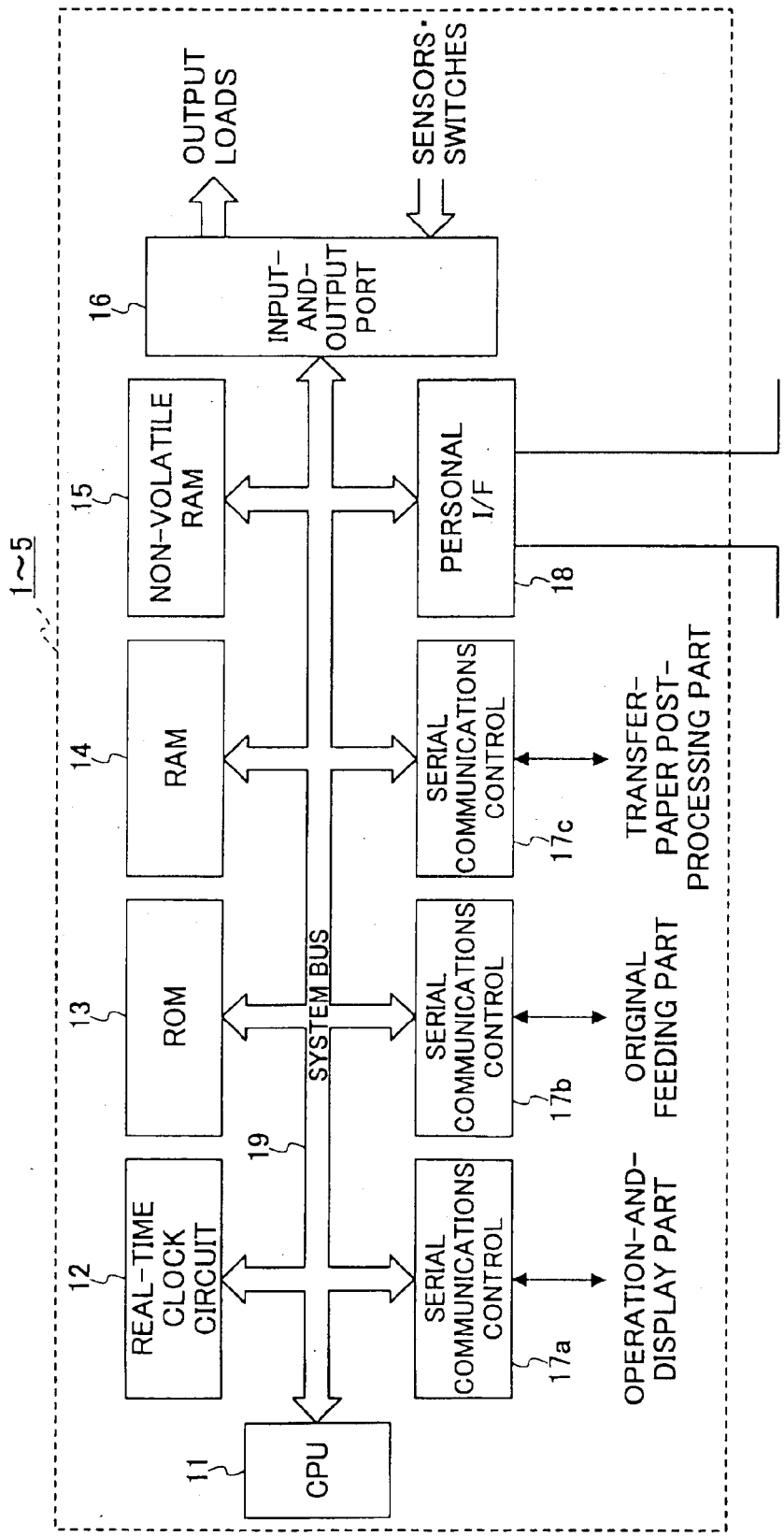
FIG. 2 shows a block diagram of each image formation apparatus shown in FIG. 1.

FIG. 2 is a block diagram showing an example of a configuration of a control part of each image formation apparatus 1–5 of FIG. 1. The control part of each image formation apparatus 1–5 is equipped with a PPC (copy apparatus) controller which includes a CPU 11, a real-time clock circuit 12, a ROM 13 and a RAM 14, a non-volatile RAM 15, an input-and-output port 16, and serial communication control units 17a, 17b, and 17c, a personal interface (an "interface", called "I/F" below) 18, and a system bus 19.

The CPU 11 is a central processing unit which controls the whole of the above-mentioned control parts by a control program in the ROM 13. The real-time clock circuit 12 is a time information generation unit to generate time information which shows the present time, and when the CPU 11 reads it, it can know the present time. The ROM 13 is a read-only memory which stores various fixed data containing the control program which the CPU 11 uses. The RAM 14 is a memory for a temporarily storage purpose which is used as a work memory used in case the CPU 11 performs data processing.

The non-volatile RAM 15 is a memory which stores the contents of mode instructions from an operation display part which is not shown, etc., and even if the power supply of the image formation apparatus is turned off, it holds the contents stored. This non-volatile RAM 15 is used also as a counter memory which stores counter value information includes the counted number of sheets on image formation (summation) according to image formation operation, and shows the value of the counter according to the instructions from the CPU 11. This non-volatile RAM 15 may be replaced by another non-volatile memory, such as a flash ROM, etc.

The input-and-output port 16 makes connections with various output loads such as a motor in image formation apparatus, a solenoid, a clutch, etc., and sensor switches. The serial communications control unit 17a makes exchange of signals with the operation display part. The serial communications control unit 17b makes exchange of signals with a document feeding part, not shown. The serial communications control unit 17c makes exchange of signals with a transfer-paper post-processing part which is not shown.

The personal I/F 18 is an interface circuit which manages communications with the data-communications apparatus 7, and is prepared in order to reduce the load of the CPU 11 for the communications control with the data-communications apparatus 7. The function of this personal I/F 18 may be taken into the CPU 11. The main functions of this personal I/F 18 are as shown in the following items (1)–(4):

(1) Monitoring the polling/selecting from the data-communications apparatus 7;

(2) Making affirmative/negative response to the data-communications apparatus 7;

(3) Checking of correctness of transmission/reception data to/from the data-communications apparatus 7, parity check, and performing resending request processing at a time of error occurrence; and (4) Processing on the header of the transmission/reception data to/from the data-communications apparatus 7.

The system bath 19 is a bus line which includes an address bus, a control bus, and a data bus, and connects the CPU 11, the real-time clock circuit 12, the ROM 13 and the RAM 14, the non-volatile RAM 15, the input-and-output port 16, the serial communications control units 17a, 17b, and 17c, and the personal I/F 18, mutually.

Figure 3:
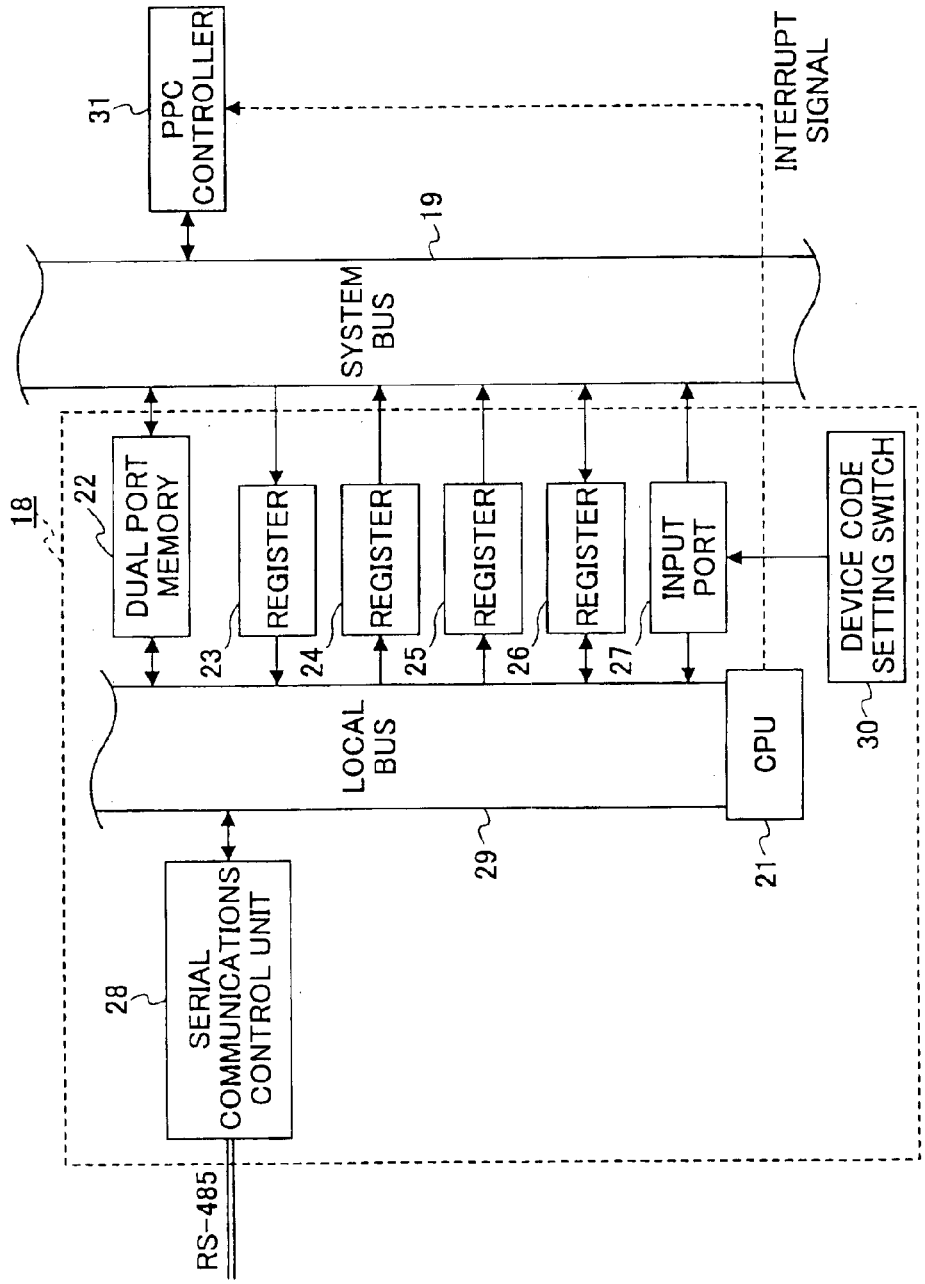
FIG. 3 shows a block diagram of a personal I/F shown in FIG. 2.

FIG. 3 is a block diagram showing an example of configuration of the personal I/F 18 of FIG. 2. This personal I/F 18 includes a CPU 21, a dual port memory 22, registers 23–26, an input port 27, a serial communications control unit 28, a local bus 29, and a device code setting switch 30. The CPU 21 is a microcomputer in one chip which includes a central processing unit, a ROM and a RAM, a bus that connects them, and controls the whole of this personal I/F 18. The dual port memory 22 is a data memory on which writing/reading can be made by either one of the CPU 21 and the CPU 11 of FIG. 2, and is used for transfer of text data between the personal I/F 18 and the PPC controller 31.

The PPC controller 31 includes the above-mentioned CPU 11, real-time clock circuit 12, ROM 13 and RAM 14, non-volatile RAM 15, input-and-output port 16, and serial communications control units 17a, 17b, and 17c. The registers 23–26 are used in control at an occasion of transfer of the above-mentioned text data. The device code setting switch 30 is used for setting up a unique device code (device address) on every image formation apparatus for the purpose of identification thereof, for polling/selecting from the data-communications apparatus 7. The serial communications control unit 28 makes a connection with the personal I/F 18 of another image formation apparatus and/or the data-communications apparatus 7.

Figure 4:
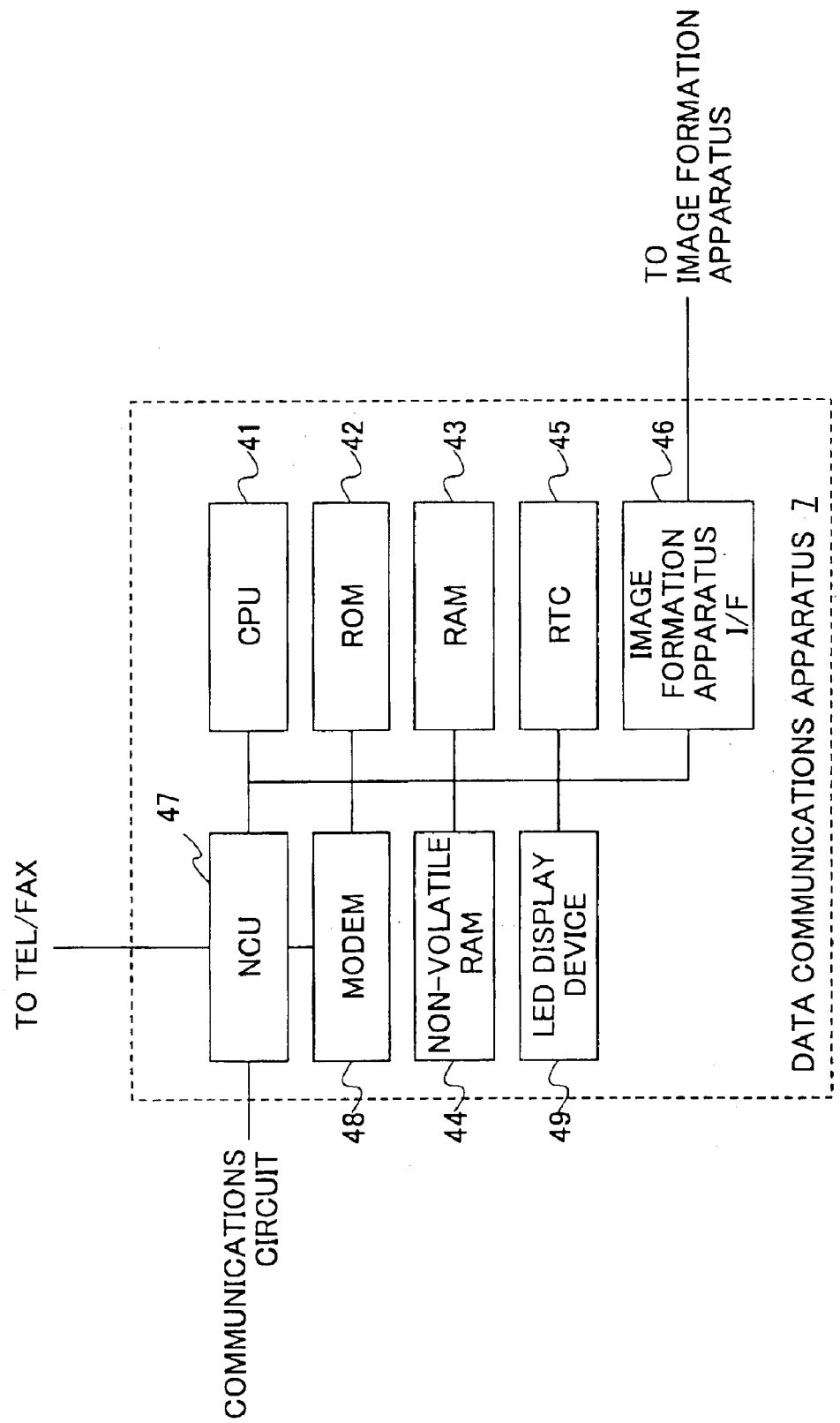
FIG. 4 shows a block diagram of a data-communications apparatus shown in FIG. 1.

FIG. 4 is a block diagram showing an example of configuration of the data-communications apparatus 7 of FIG. 1. The data-communications apparatus 7 includes a CPU 41, a ROM 42, a RAM 43, a non-volatile RAM 44, a real-time clock circuit (henceforth "RTC") 45, an image formation apparatus I/F 46, a net control device (henceforth "NCU") 47, a modem 48, and a LED display part 49.

The CPU 41 performs the following control according to a control program in the ROM 42. That is, it controls some or all of the image formation apparatuses 1–5, controls transfer of instruction signals to the central management apparatus 6 through the communications circuit 8 by the NCU 47, makes a call to the central management device 6 via the communications circuit 8 with various report information from the image formation apparatuses 1–5, performs switching control (including switching timing control) as to whether the communications circuit 8 should be connected with the image formation apparatuses 1–5, a common telephone set (TEL) or a facsimile apparatus (FAX), etc. Thus, it controls the whole of the data communications apparatus 7.

This CPU 41 performs functions as a connection unit, a status information transmitting unit, a parameter setting unit, and a parameter change occurrence inquiry unit by operating according to a program in the ROM 42, and using the RTC 45, image formation apparatus I/F 46, NCU 47, and modem 48 appropriately. The ROM 42 is a read-only memory which stores various fixed data containing a control program which the CPU 41 uses. The RAM 43 is a memory for temporarily storage which is used as a work memory used in case the CPU 41 performs data processing.

The non-volatile RAM 44 stores various parameters, i.e., transmission data (status information etc.) from either one of the central management apparatus 6 and the image formation apparatuses 1–5 to another one; the device code and the ID code (the telephone number of the data communications apparatus 7 and the type/manufacture number of each image formation apparatus) for identifying the respective ones of the image formation apparatuses 1–5; the telephone number of the central management apparatus 6; the number of times of re-calling which should be made when circuit connection is not successful (number of times of a re-dialing), the re-calling interval, etc. This memory is powered by a battery, not shown, so as to hold the storage contents even when the power supply of the data-communications apparatus 7 is turned off.

An example of the various parameters stored/set up beforehand in a predetermined parameter storage area of the non-volatile RAM 44 of the data-communications apparatus 7 is shown in FIG. 5. These various parameters are those applied in case where the image formation apparatuses 1–5 are copying machines (PPC). These various parameters include the telephone numbers for respective call types, re-dial waiting time, the number of times of re-dialing, the PPC types/manufacture numbers for the device addresses 0–4, a counter value reporting day, alarm call reporting time, block billing call reporting time, counter call reporting time, etc.

Each of the telephone numbers for serviceman call (SC)/manual call (MC), the telephone number for an alarm call, and the telephone number for block billing are those belonging to the central management apparatus 6. The PPC type/manufacture number for the device address (device code) 0 corresponds to the image formation apparatus 1; the PPC type/manufacture number for the device address 1 corresponds to the image formation apparatus 2; the PPC type/manufacture number of the device address 2 corresponds to the image formation apparatus 3, the PPC type/manufacture number of the device address 3 corresponds to the image formation apparatus 4, and the PPC type/manufacture number of the device address 4 corresponds to the image formation apparatus 5.

The counter value reporting day of the device address 0 means the day at which the counter value information saved in the storage area for the image formation apparatus 1 in the counter memory A mentioned later is copied to a storage area for the image formation apparatus 1 in a counter memory C. Similarly, the counter value reporting day of the device address 1 means the day at which the counter information saved in the storage area for the image formation apparatus 2 in a counter memory A is copied to the storage area for the image formation apparatus 2 in the counter memory C. Similarly, the counter value reporting day of the device address 2 means the day at which the counter information saved in the storage area for the image formation apparatus 3 in the counter memory A is copied to the storage area for the image formation apparatus 3 in the counter memory C. Similarly, the counter value reporting day of the device address 3 means the day at which the counter information saved in the storage area for the image formation apparatus 4 in the counter memory A is copied to the storage area for the image formation apparatus 4 in the counter memory C. Similarly, the counter value reporting day of the device address 4 means the day at which the counter information saved in the storage area for the image formation apparatus 5 in the counter memory A is copied to the storage area for the image formation apparatus 5 in the counter memory C.

The counter call reporting time (counter call calling time) means the time at which the counter value information stored in the counter memory is reported/transmitted to the central management apparatus 6 as counter call information (maintenance contract management data).

Although not shown in FIG. 5, the counter value information acquisition time at which the counter value information is to be obtained as described above is also stored in the parameter storage area of the non-volatile RAM 44. The counter value information acquisition time and the counter call reporting time are set up so that the counter value information acquired/obtained is sent to the central management apparatus 6 periodically at intervals longer than the acquisition intervals. In the parameter storage area in the non-volatile RAM 44, a time (parameter change occurrence inquiry time) at which whether or not any change in parameters occurs is inquired to the central management apparatus 6 is stored.

The RTC 45 acts as a time information generation unit to generate time information which shows the present time, and when the CPU 41 reads it, it can know the present time. The image formation apparatus I/F 46 acts as an interface circuit which manages serial communications with the image formation apparatuses 1–5 which are the targets of remote management performed by the central management apparatus 6. The NCU 47 is used for connecting the data-communications apparatus 7 to the communications circuit 8, and is equipped with automatic calling/call-accepting functions.

The modem 48 carries out modulation/demodulation of the data transmitted/received. That is, when transmitting data (information) to the central management apparatus 6, the data is modulated in a form which can be passed through the communication circuit 8. Moreover, when the modulated data which is sent from the central management apparatus 6 is received, it is restored thereby. The LED display part 49 is used for telling the power ON/OFF state in the data-communications apparatus 7, whether or not the data-communications apparatus 7 is connected to the communications circuit 8, and so forth.

Functions of this image formation apparatus management system will now be described. This image formation apparatus management system has the following three functions (1)–(3):

(1) Communications control to the image formation apparatuses 1–5 from the central management apparatus 6;

(2) Communications control to the central management apparatus 6 or to the data-communications apparatus 7 from the image formation apparatuses 1–5;

(3) Control unique to the data-communications apparatus 7.

The communications control from the central management apparatus 6 to the image formation apparatuses 1–5 includes the following items (a)–(c), for example:

(a) Reading and resetting the counter value information i.e., the total number of sheets of image formation (sum total number of sheets of image formation) on each specific image formation apparatus, the number of sheets of image formation for every sheet feeding tray, the number of sheets of image formation for each transfer paper size, the total number of times of mis-feeding operations, the number of times of mis-feeding operations for each transfer paper size, the number of times of mis-feeding operations for each transfer paper conveyance position, etc.

(b) Setting up and reading adjustment values such as the control voltage, current, resistance, timing, etc of each functional unit included in the image formation apparatus.

(c) Returning the results (text) of the communications under the communications control item (2) to the central management apparatus 6 from the image formation apparatuses 1–5.

The above-mentioned control operations are achieved by means of selecting operation on the image formation apparatuses 1–5 by the data-communications apparatus. The selecting operation means an operation of choosing each one of the image formation apparatuses 1–5, and communicates is made therewith, appropriately.

Figure 6:
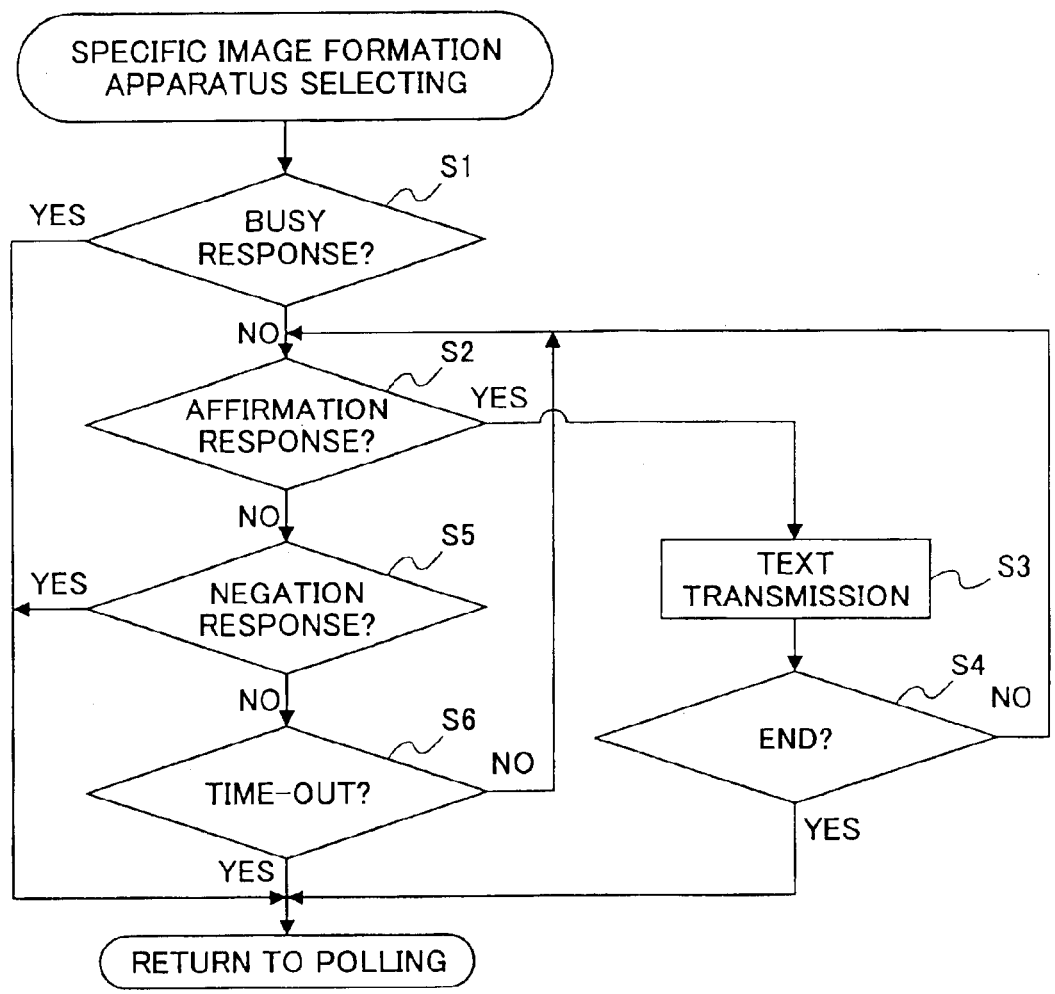
FIG. 6 shows an operation flow chart illustrating a selecting operation performed by the data-communications apparatus shown in FIG. 1.

FIG. 6 is a flow chart which shows an example of the selecting operation in the data-communications apparatus 7. Each image formation apparatus 1–5 has a unique/specific device code, and the data-communications apparatus 7 sends out a selecting signal (SA signal) which is a specific code (or a combination of codes) predetermined to indicate the selecting function and the device code of the image formation apparatus which should be chosen at the time, onto the serial communications interface RS-485.

Then, each image formation apparatus 1–5 receiving this selecting signal compares the device code subsequent to the selecting signal with the own device code. When the comparison result shows a coincidence, it recognizes that the own apparatus is selected. The thus selected image formation apparatus outputs a busy response in a specific code (or a combination of codes) predetermined when it has data to send out in a step S1. When this busy response is received, the data-communications apparatus 7 interrupts the selecting operation, and then performs a polling operation described below (No of the step S1).

When there is no data to send out, the selected image formation apparatus determines as to whether it can respond to the selecting operation. When it can respond thereto, it outputs an affirmation response in a specific code (or a combination of codes) predetermined (Yes in a step S2), and performs communications with the data-communications apparatus 7. Then, in a step S3, the data-communications apparatus 7 starts transmission of predetermined text information to the selected image formation apparatus. For example, the data-communications apparatus 7 sends a request to return the counter value information, to the image formation apparatus. In such a case, the image formation apparatus receiving this request prepares to return the counter value information, and then, sends it out to the data-communications apparatus 7 at an occasion of subsequent polling operation.

When the selected image formation apparatus cannot respond to the relevant selecting operation (No in the step S2), it sends out a negative response in a step S5 in a specific code (or combination of codes) predetermined, and communications with the data-communications apparatus 7 is ended. Moreover, when the image formation apparatus corresponding to the device code which the data-communications apparatus 7 outputs can output neither affirmation response nor negative response by a reasons of power down, or the like, the data-communications apparatus 7 ends the selecting operation after a predetermined time elapsed (Yes in a step 6).

The above-mentioned communications control item (2) includes, for example, the following items (a)–(e) on communications to the central management apparatus 6 or the data-communications apparatus 7 from the image formation apparatuses 1–5.

(a) Each image formation apparatus 1–5 transmits immediately information (urgent call information) to the central management apparatus 6 through the data-communications apparatus 7 and the communications circuit 8, when a trouble (failure) occurs by which normal image formation operation cannot be performed there (emergency dial).

(b) Each image formation apparatus 1–5 responds to key operation on the operation display part made by a user (customer), and enters a user request input mode different from a normal image formation mode for a user to input a request (a repair request, a supply request, or the like). Then it displays a user request input screen on a character display device of the operation display part, and, in response to the user inputting a request by pressing a bottom of a predetermined key on the screen, the request information (urgent call information, for example) is immediately transmitted to the central management apparatus 6 through data-communications apparatus 7 and the communications circuit 8 (emergency dial).

(c) Each image formation apparatus 1–5 transmits information (urgent call information), such as a total sum of the number of sheets of image formation or ordering for transfer paper sheets, to the central management apparatus 6 through the data-communications apparatus 7 and the communications circuit 8 immediately, whenever the total sum of number of sheets of image formation reaches a predetermined value (contract number of sheets) set up beforehand (emergency dial).

(d) Each image formation apparatus 1–5 transmits, at every predetermined term, information indicating the total sum of number of sheets of image formation to the data-communications apparatus 7. The data-communications apparatus 7 then transmits collectively the information thus received until then at a predetermined time of the current date (set up beforehand by the central management apparatus 6, and is stored in the non-volatile RAM 44 in the data-communications apparatus 7), to the central management apparatus 6 through the communication circuit 8 (non-emergency dial). This communications control includes performing transmission of the information to the central management apparatus 6 even the predetermined time has not come yet when the number of times of reporting received until then reaches a predetermined value.

(e) Each image formation apparatus 1–5 can perform normal image formation operation start, while transmitting information indicating the situation when a necessary preventive maintenance work should be performed, i.e., the number of times of operations of specific part/component approaches to a predetermined value, a sensor value reaches a predetermined value, etc., for example, to the data-communications apparatus 7. The data-communications apparatus 7 transmits collectively the information received until then at a predetermined time (set up by the central management apparatus 6, and is stored in the non-volatile RAM 44 in the data-communications apparatus 7) of the current date to the central management apparatus 6 through the communication circuit 8 (non-emergency dial). This communications control includes performing transmission of the informational to the central management apparatus 6 even when the predetermined time has not come yet when the number of times of reporting received until then reaches a predetermined value.

These communication control operations are performed at an occasion of polling operation performed from the data-communications apparatus 7 to the respective image formation apparatuses. The polling means a function of specifying the five image formation apparatuses 1–5 connected to the data-communications apparatus 7 in sequence, and determining whether or not any communications request occurs in the specified image formation apparatus. Then, when the communications request occurs, necessary communications are performed with the currently specified image formation apparatus.

Figure 7:
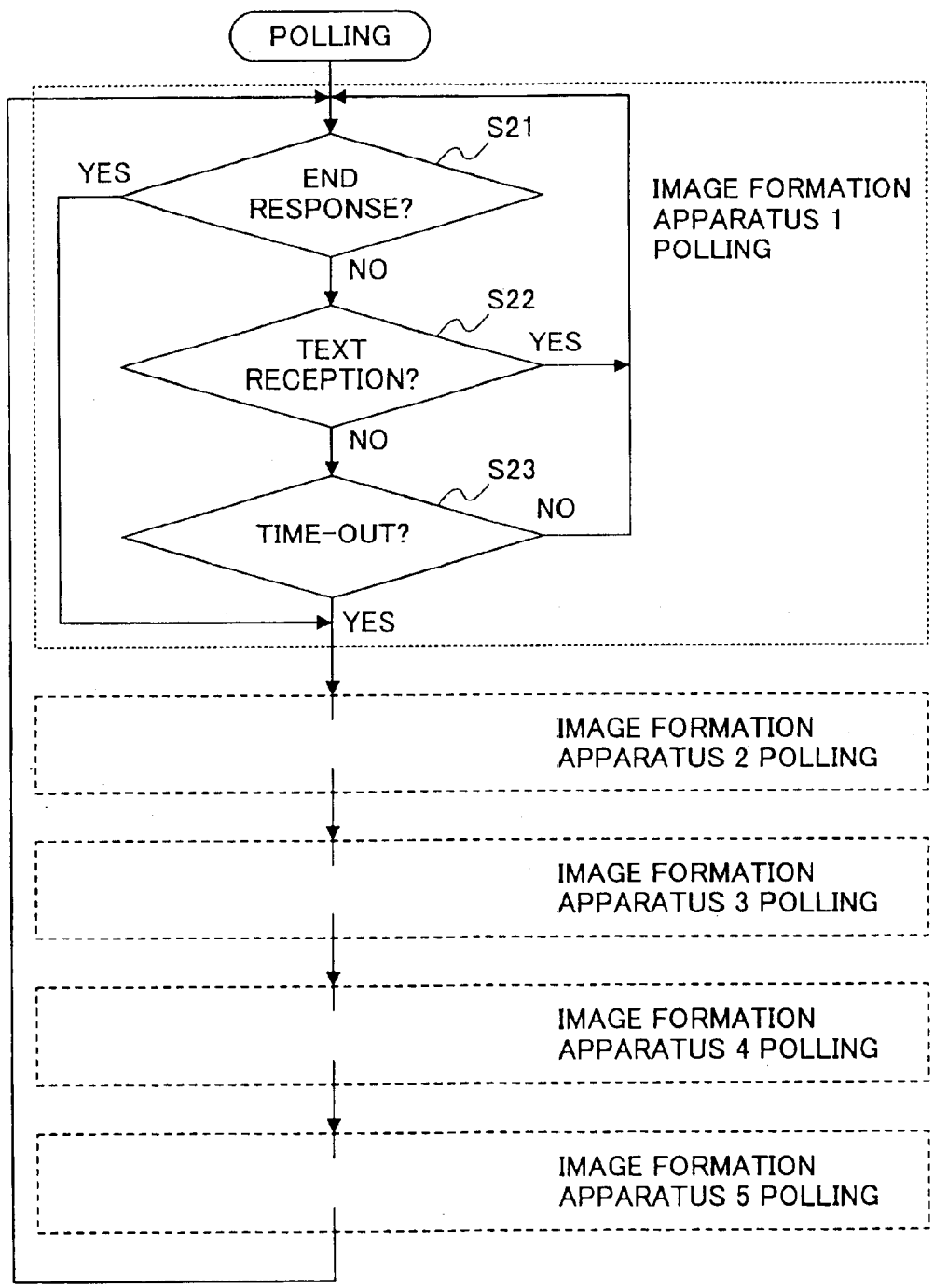
FIG. 7 shows an operation flow chart illustrating a polling operation performed by the data-communications apparatus shown in FIG. 1.

FIG. 7 is a flow chart which shows an example of the polling operation in the data-communications apparatus 7. The data-communications apparatus 7 sends out a polling signal (PA signal) including a specific code (or combination of codes) which shows the polling function defined beforehand, and the device code of the image formation apparatus which should be currently chosen, onto the serial communication interface RS-485. Then, each image formation apparatus 1–5 compares the device code subsequent to the PA signal with the own device code, and, when the comparison result indicates a coincidence, it recognizes as being specified by the current polling.

Next, when the image formation apparatus specified by the polling has data to send out (communications request to the data-communications apparatus 7 or central management apparatus 6), it starts communications with the data-communications apparatus 7 to send out the relevant data (Yes in a step S22). On the other hand, when the relevant image formation apparatus has not data to send out, or the communications to send out the data is finished, it issues an end response in a specific code (or combination of codes) defined beforehand, and ends the communications with the data-communications apparatus 7. The data-communications apparatus 7 starts a polling operation on the subsequent image formation apparatus when the end response is received (Yes in a step S21).

When the image formation apparatus corresponding to the device code which the data-communications apparatus 7 outputs cannot start communications by the reasons of power down or the like, or cannot output the end response, the data-communications apparatus 7 ends the polling operation after a predetermined time elapsed (in Yes in a step S23). The data-communications apparatus 7 repeats such a polling operation successively on the respective image formation apparatuses 1–5 connected thereto, unless a selecting operation such as that described above with reference to FIG. 6 occurs.

The above-mentioned control item (3) unique to the data-communications apparatus 7 includes the following items (a) and (b):

(a) Reading the total count values;

(b) Returning a result of the communications made to the data-communications apparatus 7 from the image formation apparatuses 1–5 in the above-mentioned communications control item (2).

Control of reading of the total count values (counter value information) is made by means of the selecting operation performed on the respective image formation apparatuses 1–5 every day at a predetermined time (00:00 midnight; however, in case the power supply of the image formation apparatus is turned off at this time, the time at which the power supply thereof is turned on after the time of 00:00).

The data-communications apparatus 7 has the above-mentioned three storage areas A, B and C (referred to as counter memories A, B and C) for storing the counter value information in the non-volatile RAM 44, and writes the counter value information acquired read out by means of the above-mentioned selecting operation performed every day into the counter memory A. Thereby, the counter memory A has its counter value information updated every day by the latest data exception holiday in which the power of each image information apparatus is turned off, for example. Upon updating the counter value information, the counter value information stored until then is saved into the counter memory B. That is, the data-communications apparatus 7 writes the counter value information immediately proceeding to the latest counter value information read out from the image formation apparatus 1–5 at this time into the counter memory B.

Moreover, the counter value information saved in the counter memory A is moved to the counter memory C at a predetermine time (set up by a request from the central management apparatus 6, and is stored by the non-volatile RAM 44 in the data-communications apparatus 7). The counter value information thus stored in the counter memory C is transmitted to the central management apparatus 6 as counter call information (also referred to as counter check data) from the data-communications apparatus 7. The following two methods (a) and (b) are applied for this data transmission from the data-communications apparatus 7 to the central management apparatus 6:

(a) The central management apparatus 6 reads the counter value information saved in the counter memory C of the data-communications apparatus 7 after the above-mentioned predetermined time at which the contents of the counter memory A are copied to the counter memory C. That is, it accesses the data-communications apparatus 7 (makes a call, and sends a reading instructions), and the contents (counter value information on each image formation apparatus 1–5) of the counter memory C transmitted from the data-communications apparatus 7 are acquired as the counter call information.

(b) The data-communications apparatus 7 autonomously makes a call to the central management apparatus 6 through the communications circuit 8, and sends out, as the counter call information, the counter value information saved in the counter memory C at the counter call reporting time after the above-mentioned date/time. The counter call reporting time at which the autonomous calling is performed is also set up by a request from the central management apparatus 6, and is stored by the non-volatile RAM 44 in data-communications apparatus 7. The data-communications apparatus 7 has a plurality of combinations each including the counter memories A, B, and C. This is because various types of total counter values may be applied, for example, particularly for monochrome copy, for an application copy, for a color copy, etc.

Figure 8:
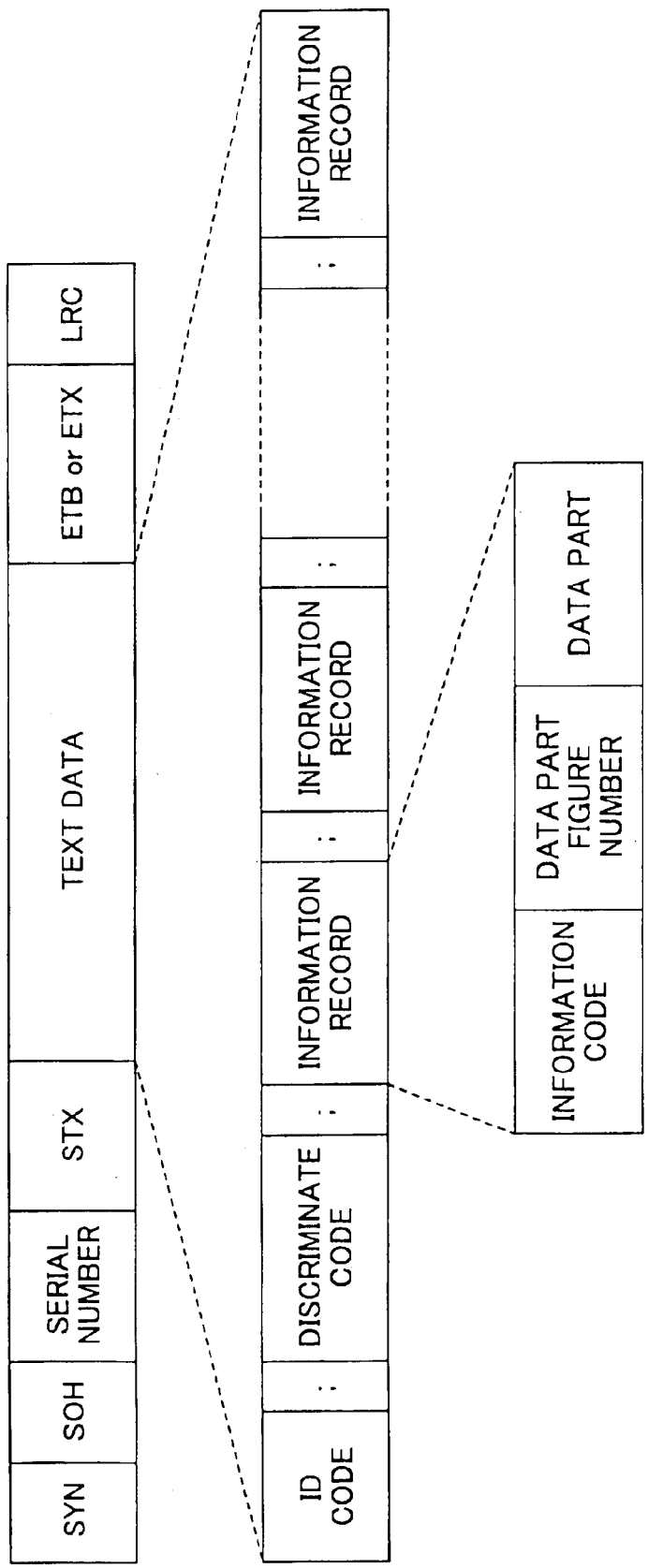
FIG. 8 shows an example of a data format of text data transferred between the image formation apparatuses and data-communications apparatus.

FIG. 8 shows an example of configuration of text data delivered and received between the central management apparatus 6 and data-communications apparatus 7. In FIG. 8, a serial number is a communication block number in one transmission occasion, starting for the first block by "01", it is made to increase by one each, and, then, "00" occurs subsequent to "99". An ID code is used for identifying a specific one of the data-communications apparatus 7 and the five image formation apparatuses 1–5 connected to the data-communications apparatus 7. This ID code includes the telephone number of data-communications apparatus 7, or the type/manufacture number of the relevant one of the image formation apparatuses. A discriminate code includes a code (process code) indicating the type of the purpose of communications with the information concerning the transmission origin and destination.

The process code is defined as shown in Table 1 below.

TABLE 1

| CODE | NAME OF PROCESSING | CONTENTS OF PROCESSING |
| --- | --- | --- |
| 30 | SC CALL | AUTO DIAL WHEN SC OCCURS |
| 31 | MANUAL CALL | AUTO DIAL WHEN SWITCH IS PRESSED |
| 32 | ALARM TRANSMISSION | AUTO DIAL WHEN ALARM OCCURS |
| 21 | COUNTER CALL | REPORT OF COUNTER VALUE INFORMATION |
| 22 | BLOCK BILLING | AUTO DIAL REPORTING THAT THE NUMBER OF SHEETS REACHES FOR BLOCK BILLING |
| 02 | DATA READING | READ PPC INTERNAL DATA |
| 04 | DATA WRITING | OVERWRITE PPC INTERNAL DATA |
| 03 | EXECUTION | EXECUTE TEST OR THE LIKE BY REMOTE CONTROL |
| 08 | DEVICE CODE CHECK | CHECK FOR COMMUNICATIONS FUNCTION |

An information record includes an information code, the number of data part figures, and a data part, and defined as shown in Table 2 below. Between the information record and the information record, between the discernment code and the information record, and between the ID code and the discernment code, separators by the semicolons (;) are inserted respectively, as shown.

TABLE 2

| CODE | DATA LENGTH | CONTENTS |
| --- | --- | --- |
| INFORMATION CODE | 11 | INDICATES SPECIFIC TYPE OF INFORMATION |
| DATA PART FIGURE | 2 | INDICATES THE DATA LENGTH OF DATA PART BY ASCII CODE; "00" |

TABLE 2-continued

| CODE | DATA LENGTH | CONTENTS |
| --- | --- | --- |
| NUMBER DATA PART | VARIABLE LENGTH | WHEN NO DATA PART EXISTS CONTENTS OF EACH INFORMATION CODE |

Figure 9:
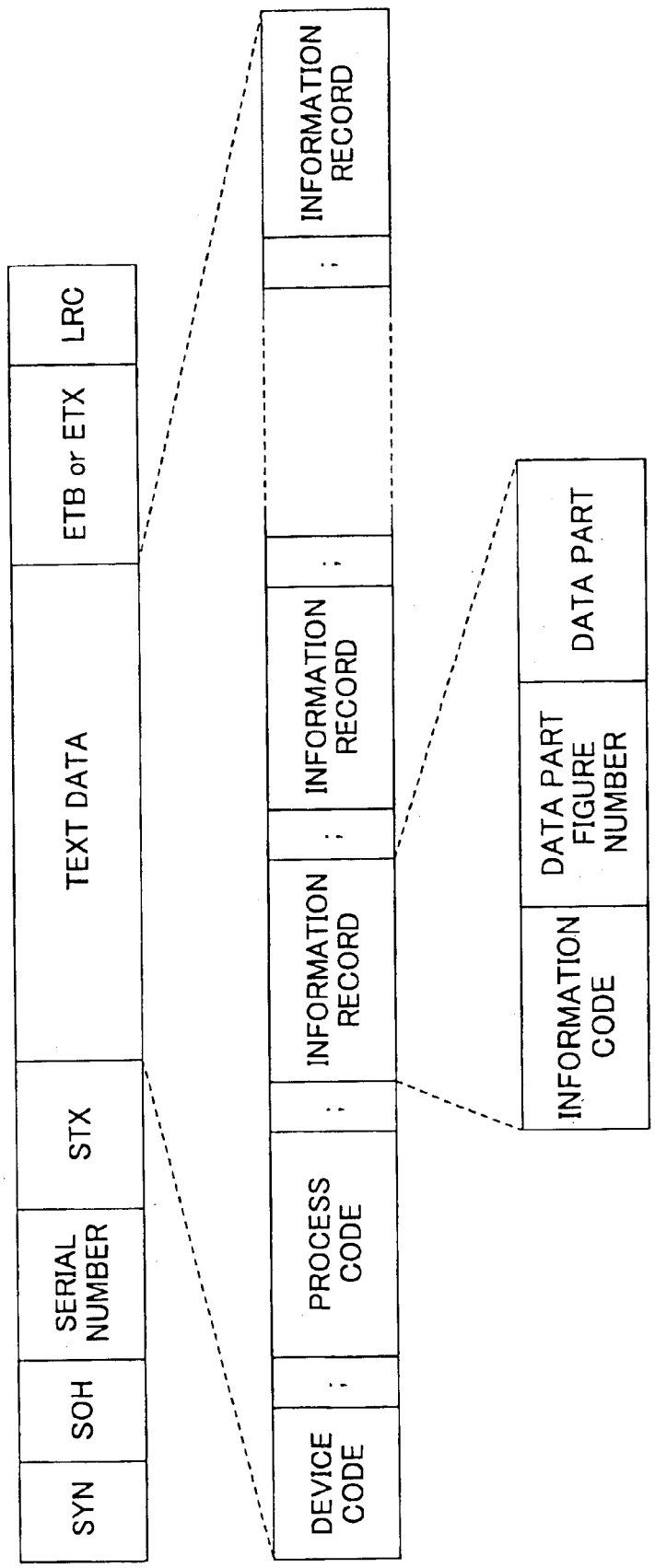
FIG. 9 shows an example of a data format of text data transferred between the personal I/F in the image formation apparatuses and the data-communications apparatus.

FIG. 9 shows an example of configuration of text data delivered and received between the personal I/F 18 of the data-communications apparatus 7 and the image formation apparatuses 1–5. A device code is set up uniquely by the device code setting switch 30 (see FIG. 3) every image formation apparatus 1–5 as mentioned above. As to the relation with the ID code in FIG. 8, the device code is read from the image formation apparatus and is stored in the non-volatility RAM 44 in the data-communications apparatus 7 when each image formation apparatus 1–5 is first connected thereto, and is switched appropriately according to the text-data transfer direction. A processing code is a code which indicates the type of communications purpose as mentioned above. The processing code does not include the information concerning the transmission source and destination in comparison to the discriminate code shown in FIG. 8. This is appropriately added/removed according to the text data transfer direction by the data-communications apparatus 7.

Figure 10:
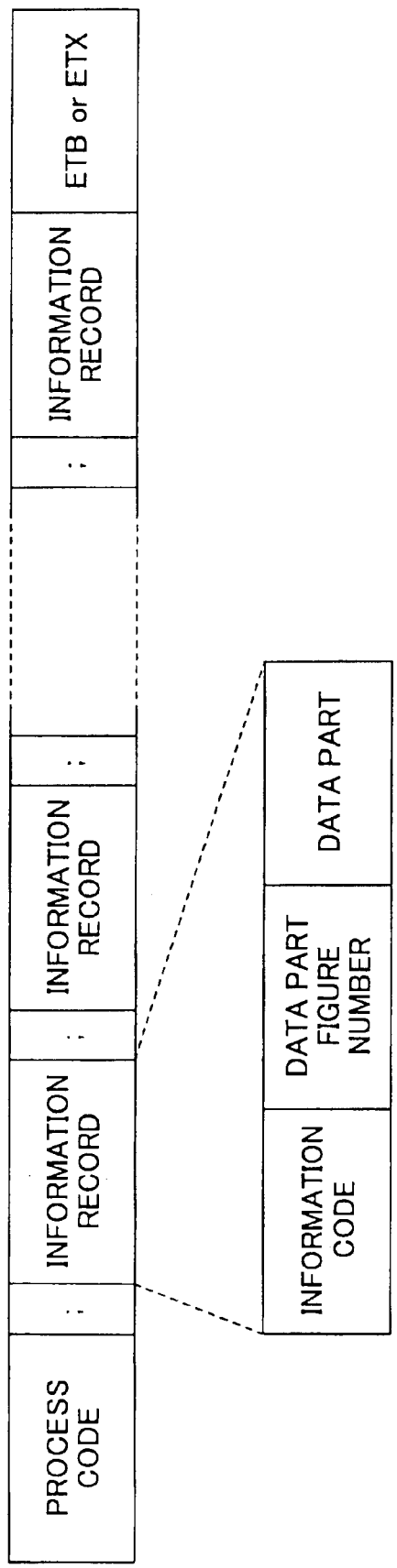
FIG. 10 shows an example of a data format of text data transferred between the personal I/F and a PPC controller in each of the image formation apparatuses.

FIG. 10 shows an example of configuration of the text data delivered and received between the personal I/F 18 of the image formation apparatus 1–5, and the PPC controller 31 (see FIG. 3) thereof. In comparison to the format of text data shown in FIG. 9 transferred between the data-communications apparatus 7 and the personal I/F 18, the header, device code and parity part are not included in the format shown in FIG. 10.

FIG. 11 is a block diagram showing an example of outline configuration of the central management apparatus 6. The central management apparatus 6 includes a modem apparatus 101 and a communication terminal apparatus 102. The communication terminal apparatus 102 is equipped with a main part 103, and a display device 104. The main part 103 includes a hard disk drive 105 other than a control part using a microcomputer which includes a ROM which stores a control program, a CPU which performs various control by the control program, and a RAM on which data is written by the CPU. This main part 103 performs a function as a parameter change occurrence check device, a parameter transmitting device, and a history information memory device together with the modem apparatus 101.

By means of a serial interface, such as a RS232C, the communications terminal apparatus 102 is connected with the modem apparatus 101. By the communications terminal apparatus 101 and modem apparatus 101, the central management apparatus 6 performs communications with the data-communications apparatus 7. The display device 104 displays various types of data containing data received from the data-communications apparatus 7. The hard disk drive 105 stores the user ID (telephone number of the data-communications apparatus 7 at the user's end) by which the user (customer) is identified, management data for managing the image formation apparatuses 1–5 and the data-communications apparatus 7 containing the types/manufacture numbers of the image formation apparatuses 1–5 connected to the data-communications apparatus 7 at the user's end, and data received from the data-communications apparatus 7 at the user's end, and a database (DB) which saves various parameters same as those (see FIG. 5) set in the data-communications apparatus 7 at the user's end.

The CPU 41 of the data-communications apparatus 7 stores in the non-volatile RAM 44 state information, such as the counter value information acquired from the image formation apparatuses 1–5, and transmits the state information to the central management apparatus 6 based on the parameters (see FIG. 5) set up beforehand. The parameters to be stored in the non-volatile RAM 44 are downloaded through access to the data-communications apparatus 7 via the communications circuit 8 from the central management apparatus 6 at the time of installation of the data-communications apparatus 7, and is stored in the predetermined parameter storage area in the non-volatile RAM 44 of the data-communications apparatus 7.

With these parameters, the CPU 41 of the data-communications apparatus 7 performs, for example, when the counter call reporting time is set as 12:00, and the counter reporting day on the device address 0 is set as the 10th day of every month, dialing the telephone number for the counter call at 12:00 on the 10th day, and the dial signal is sent out onto the communications circuit 8, making a call to the central management apparatus 6. Then, after the circuit toward the central management apparatus 6 becomes in a connection state, the counter value information corresponding to the device address 0 is read from the non-volatile RAM 44, and is transmitted to the central management apparatus 6 as the counter call information.

The parameters in the parameter storage area in the non-volatile RAM 44 are re-set appropriately according to instructions issued by the central management apparatus 6. For example, in case the telephone numbers of the central management apparatus 6 are changed, the counter reporting day is changed, or the like, the relevant parameters are re-set.

Figure 12A:
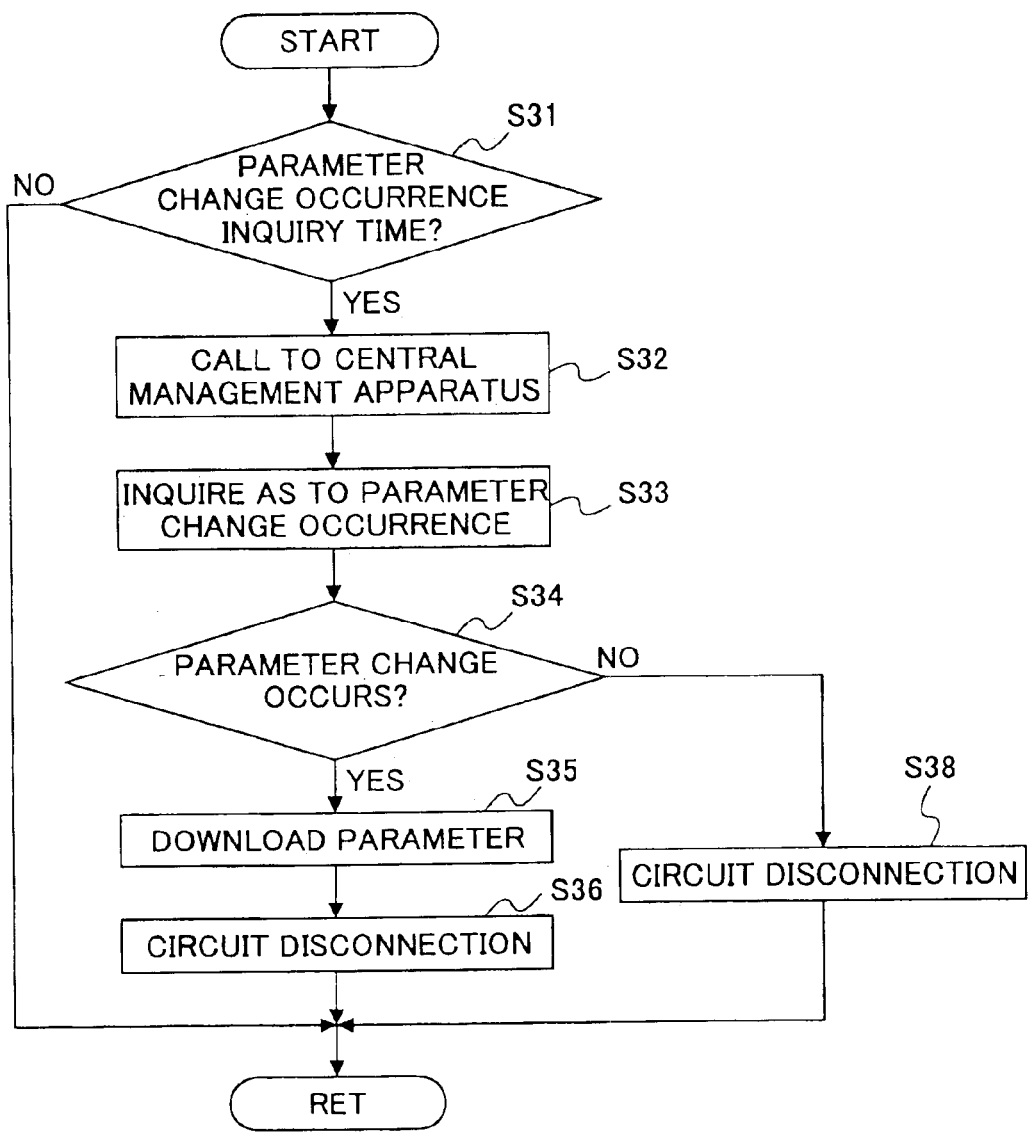
Figure 14:
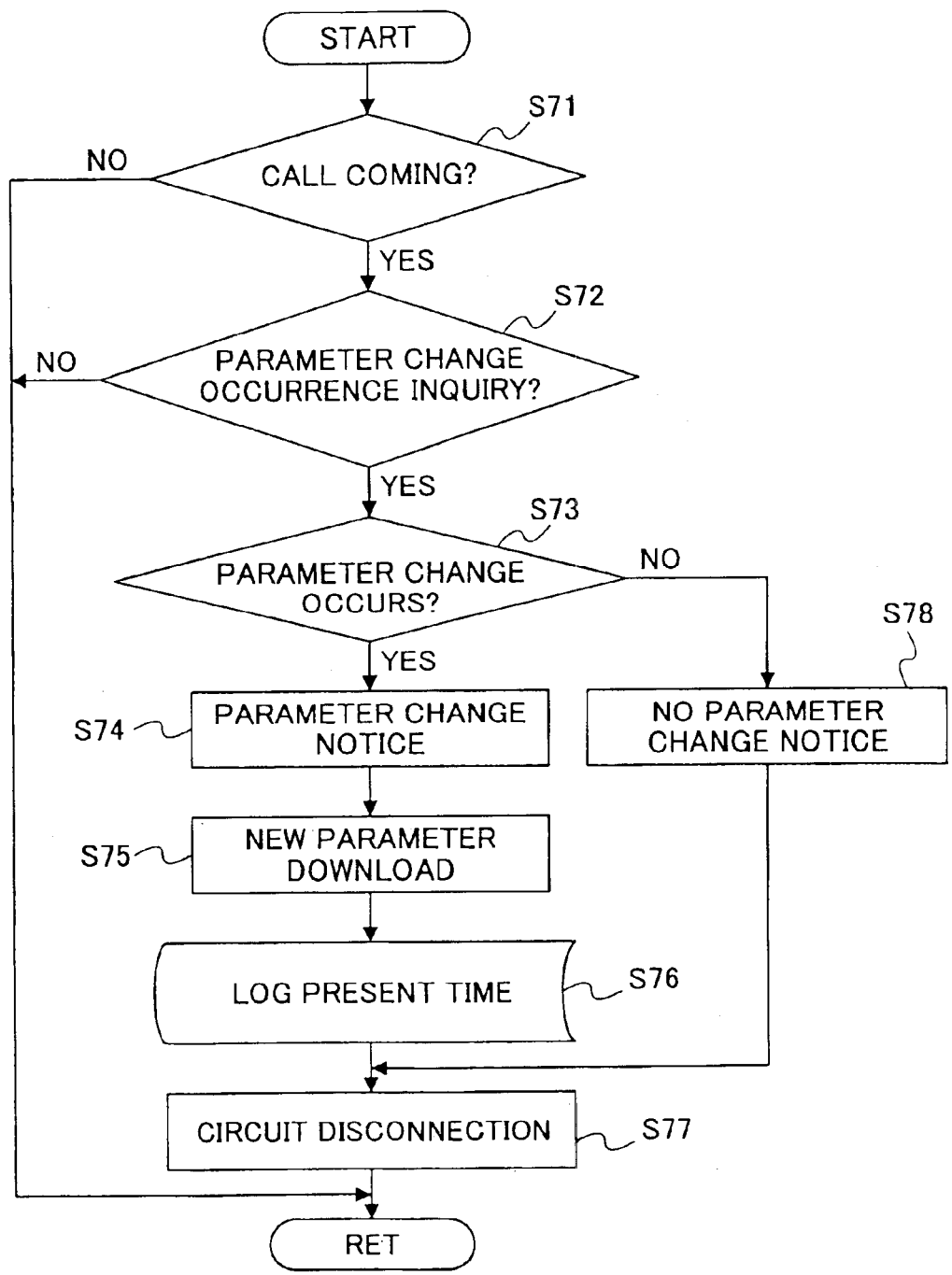
FIG. 14 illustrates an operation of a parameter check processing performed by the central management apparatus according to the present invention.
Figure 15:
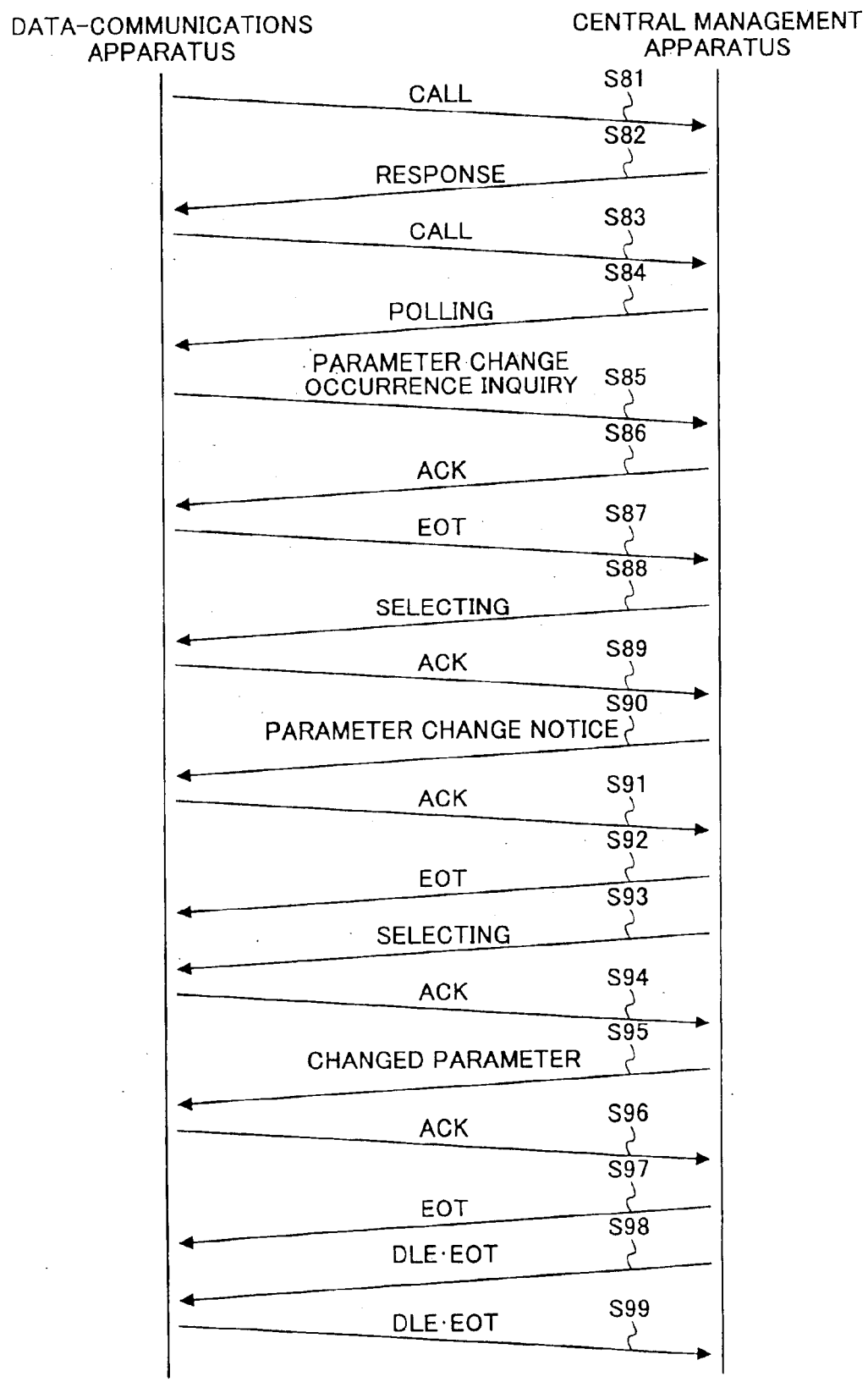
FIG. 15 illustrates a communications sequence in a case the parameter re-setting operation is performed.
Figure 16:
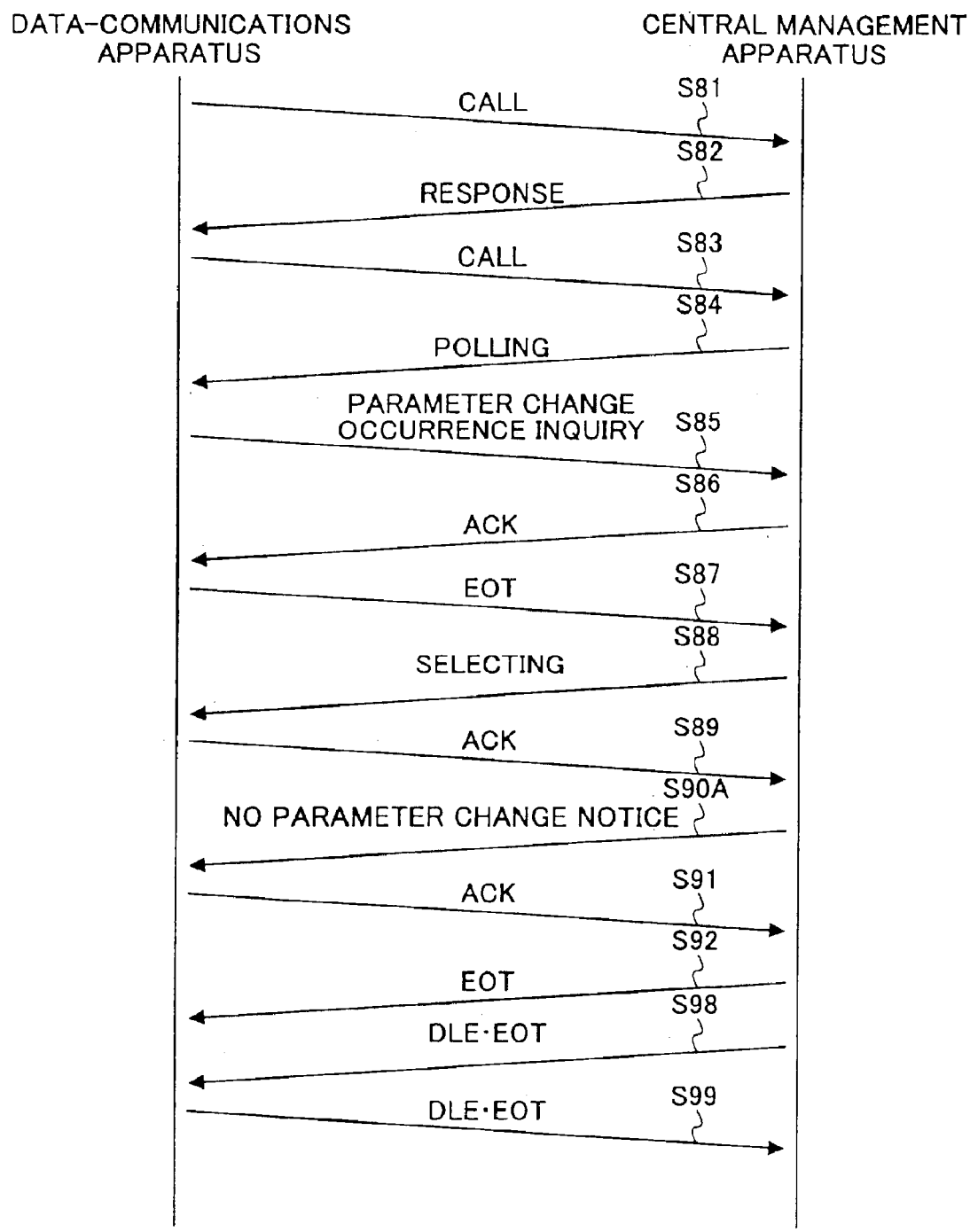
FIG. 16 illustrates a communications sequence in a case no parameter re-setting operation is performed.

FIGS. 12A and 12B show a flow chart which shows an example of such parameter re-setting processing in the data-communications apparatus 7. FIG. 14 shows a flow chart which shows an example of the corresponding parameter check processing in the central management apparatus 6. FIG. 15 shows an example of communications sequence with the central management apparatus 6 in case the data-communications apparatus 7 performs the parameter re-setting operation. FIG. 16 shows an example of communications sequence with the central management apparatus 6 in case the data-communications apparatus 7 does not perform the parameter re-setting operation.

The CPU 41 of the data-communications apparatus 7 starts the processing show in FIG. 12A for every predetermined time every month at a predetermined day (for example, every month's 1st day), and determines whether the parameter change occurrence inquiry time comes in a step S31 first, and when the time has not come yet, the operation is returned to a predetermined main routine immediately. When the parameter change occurrence inquiry time, 0:00, for example, has come, it makes a call through the communications circuit 8 to the central management apparatus 6 in a step S32, and whether or not any change in parameters occurs is asked thereby to the central management apparatus 6 in a step S33. The time (every month, the predetermined day, at the parameter change occurrence inquiry time) for the inquiry is beforehand stored in the parameter storage area in the non-volatile RAM 44. As the telephone number of the call destination, the SC/MC telephone number of the various parameters stored in the parameter storage area in the non-volatile RAM 44 is used (see FIG. 5).

On the other hand, the CPU of the main part 103 of the central management apparatus 6 starts the processing shown in FIG. 14A periodically, and checks whether or not any call comes with the modem apparatus 101 in a step S71 first, and when no call has come, the processing is returned to a predetermined main routine immediately. However, when any call has come, it determines whether or not the call includes the parameter change occurrence inquiry from the data-communications apparatus 7 in a step S72. When no parameter change occurrence inquiry is included in the call, the processing is returned to the main routine.

However, when the parameter change occurrence inquiry is included in the call, it is determined whether or not any parameter change occurs according to the database in the hard disk drive 105 in a step S73. As a result, when any parameter change occurrence is found out therefrom, processing which notifies that to the data-communications apparatus 7 of the above-mentioned inquiry source is performed through the communications circuit 8 in a step S74, and processing of downloading the new parameter information after the change is performed into the data-communications apparatus 7 of the above-mentioned inquiry source in a step S75.

Next, the present time is stored as a parameter download time (parameter re-setting time) into the database of the hard disk drive 105 with a relation to the telephone number (user ID) of the data-communications apparatus 7 of the parameter download destination in a step S76, and processing of disconnecting the circuit with the data-communications apparatus 7 is performed in a step S77. Then, the processing is returned to the main routine.

On the other hand, when it is determined that no parameter change has occurred (No in the step S73), processing of notifying that to the data-communications apparatus 7 of the above-mentioned inquiry source through the communications circuit 8 is performed in a step S78, and the processing of disconnecting the circuit with the data-communications apparatus 7 is performed in the step S77. Then, the processing is returned to the main routine.

When it is determined that no parameter change occurs according to the response to the inquiry coming from the central management apparatus 6 in a step S34, the CPU 41 of the data-communications apparatus 7 performs processing of disconnecting the circuit with the central management apparatus 6 in a step S38, and then, the processing is returned to the main routine. However, when any parameter change occurrence is found out according to the step S34, processing is performed, by which the new parameter information after the change is downloaded from the central management apparatus 6 in a step S35. The thus-downloaded information is written into a predetermined communications buffer area of the RAM 43.

After the download of new parameter information is completed, processing of disconnecting the circuit with the central management apparatus 6 is performed in a step S36. Then, the new parameter information first stored in the buffer area of the RAM 43 is temporarily stored in a predetermined temporary parameter storage area also provided in the non-volatile RAM 44 from the communications buffer area of the RAM 43. Then, the processing is returned to main routine.

Then, as shown in FIG. 12B, it is determined whether or not a predetermined parameter re-setting (overwriting) time comes in a step S41. Then, when the parameter re-setting time has come, the new parameter information temporarily stored in the temporarily parameter storage area is moved into the parameter storage area in the same non-volatile RAM 44 in a step S42. Thereby, the parameters set in the parameter storage area in the non-volatile RAM 44 are overwritten by the latest ones timely. Only after the overwriting into the parameter storage area from the temporary parameter storage area in the non-volatile RAM 44, the latest parameters downloaded are actually applied for the regular management work described above.

By means of the above-described processes, the central management apparatus 6 is given periodically occasions of sending necessary parameter change information to the data-communications apparatus 7. Accordingly, there is no possibility that the central management apparatus 6 cannot inform of a parameter change to the data-communications apparatus 7 since the central management apparatus 6 cannot actively make a contact with the data-communications apparatus 7 due to a reason concerning the situation of the user's place mentioned above, i.e., a matter of telephone exchange line connection manner, or the like.

Furthermore, a log of indicating the date/time at which parameter change information is sent to the data-communications apparatus 7 from the central management apparatus 6 is held by the central management apparatus 6 with a relation with an identification of the sending destination, as mentioned above. Thereby, the central management apparatus 6 can positively manage the currently set parameters in the data-communications apparatus 7.

Figure 13A:
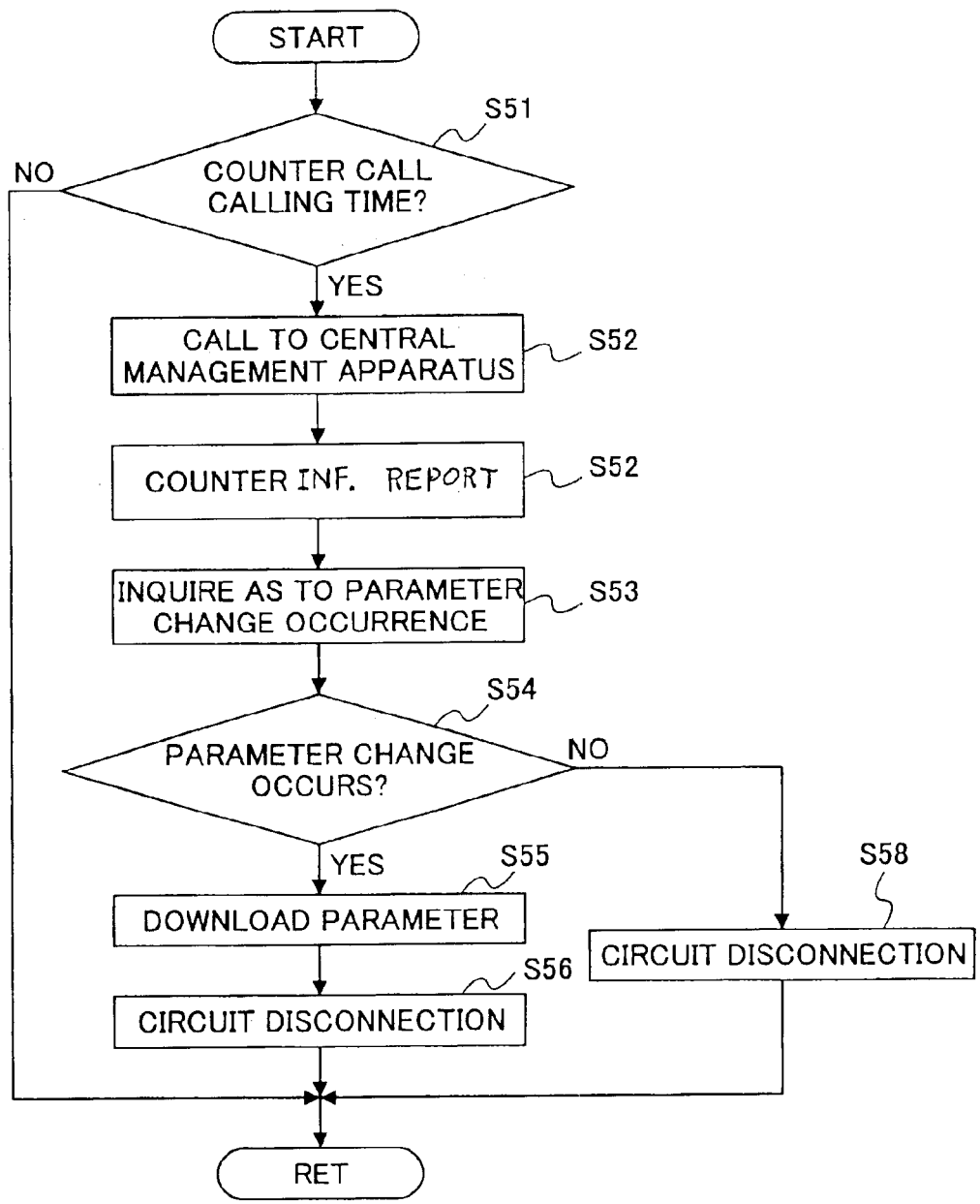
FIGS. 13A and 13B illustrate an operation in another example of a parameter re-setting processing performed by the data-communications apparatus according to the present invention.
Figure 13B:
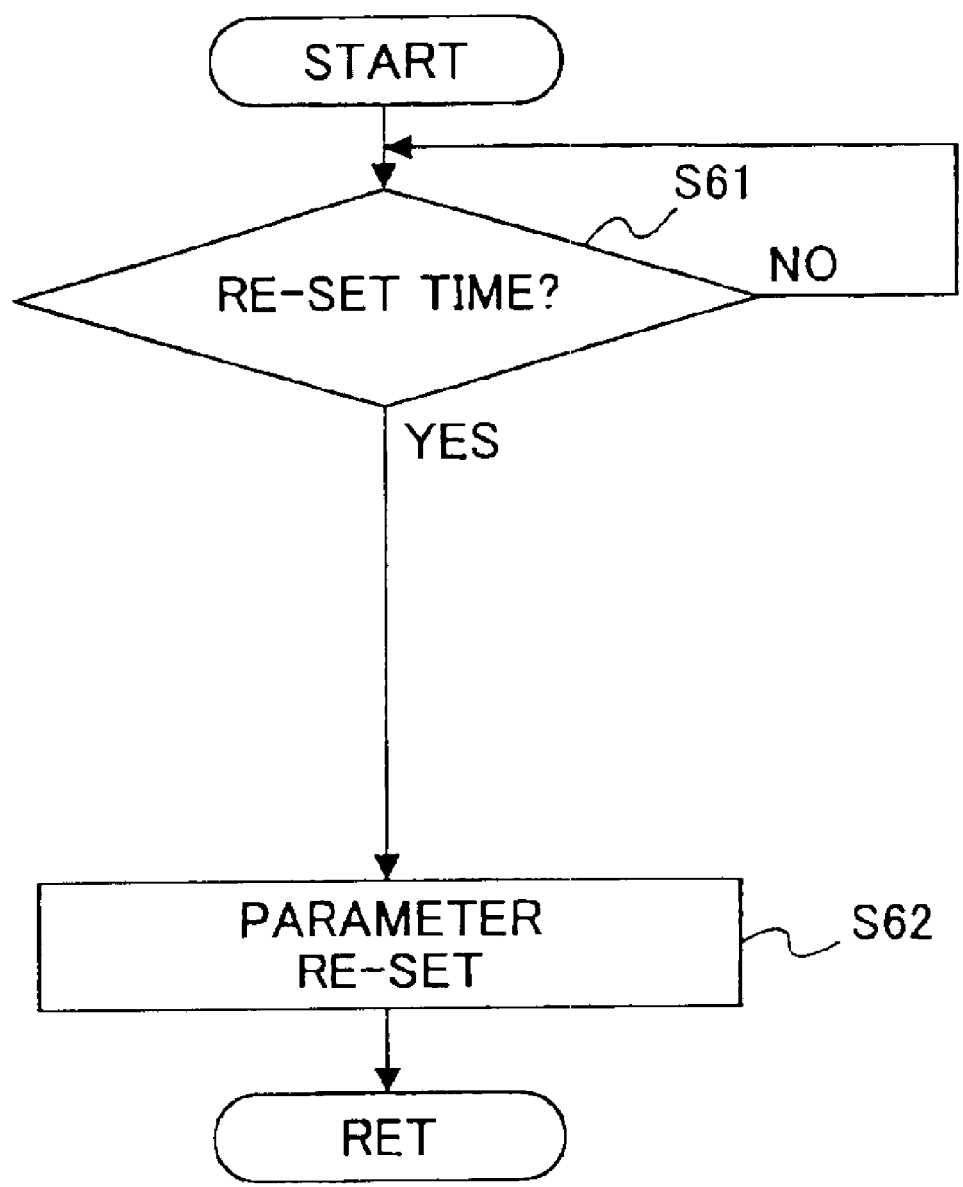

FIGS. 13A and 13B show a flow chart as a variant scheme of the scheme described above with reference to FIGS. 12A and 12B. The scheme illustrated in FIGS. 13A and 13B is the same as that illustrated in FIGS. 12A and 12B except that the occasion of parameter change occurrence inquiry is given by the occasion of another predetermined periodic occasions, i.e., the above-mentioned counter call calling time, for example, in a step S51. That is, according to the scheme shown in FIGS. 13A and 13B, the parameter change occurrence inquiry is made every time the predetermined counter call is performed at the predetermined regular intervals from the data-communications apparatus 7 to the central management apparatus 6.

Steps S52–S58 in FIG. 13A correspond to those S32–S38 in FIG. 12A, described above, respectively. Similarly, steps S61–S62 in FIG. 13B correspond to those S41–S42 in FIG. 12B, respectively.

Other than the above-mentioned counter call timing, any predetermined occasions occurring at predetermined regular intervals may be utilized instead as the occasions for the parameter change occurrence inquiry.

With reference to FIGS. 15 and 16, basic communications procedures performed between the data-communications apparatus 7 and the central management apparatus 6 for the above-mentioned parameter change occurrence inquiry according to the present invention will now be described.

In a step S81, a call is made by the step S32/S52 mentioned above. In response thereto, a response signal is returned in a step S82. After receiving the response signal, in a step S83, the data-communications apparatus 7 sends out a CALL command so as to cause the central management apparatus 6 to perform a polling operation in a step S84. In response thereto, the data-communications apparatus 7 sends a parameter change occurrence inquiry in a step S85 according to the step S33/S53 mentioned above. This inquiry is acknowledged by an ACK signal in a step S86, and, then, in a step S87, an EOT command is issued by the data-communications apparatus 7 so as to once terminate the transmission.

Then, in a step S88, the central management apparatus 6 performs a selecting operation in response to the parameter change occurrence inquiry in the step S85 from the data-communications apparatus 7. This selecting command is acknowledged by an ACK signal in a step S91, and, in response thereto, the central management apparatus 6 issues a parameter change notice in a step S90 in case a parameter change occurs therein, as shown in FIG. 15 (Yes in the step S34/S54 in FIGS. 12A/13A). After that, this notice is acknowledged in a step S91, and then the transmission is once terminated in a step S92. Then, a selecting operation is again performed by the central management apparatus 6 so as to send out new parameters in a step S95 in response to an acknowledge signal in a step S94. The new parameters are acknowledged in a step S96, then, the communications circuit is disconnected in steps S97–S99.

However, in case no parameter change occurs in the central management apparatus 6 (No in the step S34/S54), as shown in FIG. 16, this notice is sent in a step S90A, and is acknowledged in a step S91, and then, the communications circuit is disconnected in steps S97–S99.

Further, the present invention is not limited to the above-described embodiments, and variations and modifications may be made without departing from the scope of the present invention.

The present application is based on Japanese priority application. No. 2001-317644, filed on Oct. 16, 2001, the entire contents of which are hereby incorporated by reference.

What is claimed is:

1. A management system comprising:
    a center apparatus to manage a to-be-managed apparatus; and
    the to-be-managed apparatus,
    wherein:
    said center apparatus performs a predetermined management operation on said to-be-managed apparatus according to predetermined parameters;
    said to-be-managed apparatus makes a parameter change occurrence inquiry to said center apparatus for inquiring said center apparatus whether or not a parameter change occurs; and
    said to-be-managed apparatus makes the parameter change occurrence inquiry on an occasion of transmission of predetermined status information of the to-be-managed apparatus to said center apparatus.

2. The management system as claimed in claim 1, wherein:
    said to-be-managed apparatus makes the parameter change occurrence inquiry to said center apparatus at predetermined intervals.

3. The management system as claimed in claim 2, wherein:
    said to-be-managed apparatus makes a call to said center apparatus so as to establish a communications circuit therewith, and sends a message such as to make the parameter change occurrence inquiry.

4. The management system as claimed in claim 1, wherein:
    the transmission of predetermined status information is carried out periodically.

5. The management system as claimed in claim 1, wherein:
    the predetermined parameters include a telephone number of said center apparatus by which said to-be-managed apparatus makes a call thereto.

6. The management system as claimed in claim 1, wherein:
said to-be-managed apparatus is in a situation such that said center apparatus cannot directly make a contact with said to-be-managed apparatus unless receiving a call from said to-be-managed apparatus.

7. The management system as claimed in claim 1, wherein:
said to-be-managed apparatus downloads new parameter information from said center apparatus when a parameter change occurs in said center apparatus, and stores the new parameter information to a temporary storage area, and, then, the new parameter information is overwritten over existing parameter information in a regular storage area at a predetermined timing, thereby the new parameter information being actually used in the predetermined management work.

8. A data processing apparatus performing a predetermined data processing operation, wherein:
said data processing apparatus makes communications with a center apparatus which manages said data processing apparatus, via a communications circuit, wherein:
said center apparatus performs a predetermined management operation on said data processing apparatus according to predetermined parameters;
said data processing apparatus makes a parameter change occurrence inquiry to said center apparatus for inquiring said center apparatus whether or not a parameter change occurs; and
said data processing apparatus makes the parameter change occurrence inquiry on an occasion of transmission of predetermined status information of the data processing apparatus to said center apparatus.

9. The data processing apparatus as claimed in claim 8, wherein:
said data processing apparatus makes the parameter change occurrence inquiry to said center apparatus at predetermined intervals.

10. The data processing apparatus as claimed in claim 9, wherein:
said data processing apparatus make a call to said center apparatus so as to establish a communications circuit therewith, and sends a message such as to make the parameter change occurrence inquiry.

11. The data processing apparatus as claimed in claim 8, wherein:
the transmission of predetermined status information is carried out periodically.

12. The data processing apparatus as claimed in claim 8, wherein:
the predetermined parameters include a telephone number of said center apparatus by which said data processing apparatus makes a call thereto.

13. The data processing apparatus as claimed in claim 8, wherein:
said data processing apparatus is in a situation such that said center apparatus cannot directly make a contact with said data processing apparatus unless receiving a call from said data processing apparatus.

14. The data processing apparatus as claimed in claim 8, wherein:
said data processing apparatus downloads new parameter information from said center apparatus when a parameter change occurs in said center apparatus, and stores the new parameter information to a temporary storage area, and, then, the new parameter information is overwritten over existing parameter information in a regular storage area at a predetermined timing, thereby the new parameter information being actually used in the predetermined management work.

15. A management method for a center apparatus to manage a to-be-managed apparatus via a communications circuit established therebetween, comprising the steps of:
a) said center apparatus performing a management operation on said to-be-managed apparatus according to predetermined parameters;
b) said to-be-managed apparatus making a parameter change occurrence inquiry to said center apparatus for inquiring said center apparatus whether or not a parameter change occurs; and
c) said to-be-managed apparatus making the parameter change occurrence inquiry on an occasion of transmission of predetermined status information of the to-be-managed apparatus to said center apparatus.

16. The management method as claimed in claim 15, wherein
b) said to-be-managed apparatus making the parameter change occurrence inquiry to said center apparatus at predetermined intervals.

17. The management method as claimed in claim 16, wherein:
said to-be-managed apparatus make a call to said center apparatus so as to establish a communications circuit therewith, and sends a message such as to make the parameter change occurrence inquiry.

18. The management method as claim in claim 15, wherein:
the transmission of predetermined status information is carried out periodically.

19. The management method as claimed in claim 15, wherein:
the parameters include a telephone number of said center apparatus by which said to-be-managed apparatus makes a call thereto.

20. The management method as claimed in claim 15, wherein:
said to-be-managed apparatus is in a situation such that said center apparatus cannot directly make a contact with said to-be-managed apparatus unless receiving a call from said to-be-managed apparatus.

21. The management method as claimed in claim 15, wherein:
said to-be-managed apparatus downloads new parameter information from said center apparatus when a parameter change occurs in said center apparatus, and stores the new parameter information to a temporary storage area, and, then, the new parameter information is overwritten over existing parameter information in a regular storage area at a predetermined timing, thereby the new parameter information being actually used in the predetermined management work.

* * * * *